United States Patent [19]

Kromer, III et al.

[11] Patent Number: 4,601,044
[45] Date of Patent: Jul. 15, 1986

[54] CARRIER-PHASE ADJUSTMENT USING ABSOLUTE PHASE DETECTOR

[75] Inventors: Philip F. Kromer, III, Winchester, Mass.; Rangarajan Srinivasagopalan; Raul F. Fernandez, both of Miami, Fla.

[73] Assignee: Racal Data Communications Inc., Miami, Fla.

[21] Appl. No.: 548,572

[22] Filed: Nov. 4, 1983

[51] Int. Cl.$^4$ .......................... H04L 1/00; H04L 7/00
[52] U.S. Cl. ..................................... 375/17; 375/20; 375/39; 375/118; 371/43; 371/46; 371/49
[58] Field of Search ...................... 375/17, 20, 39, 42, 375/54, 57, 110, 111, 56, 83, 86, 118; 329/50, 122, 124; 371/43, 44, 45, 46, 42, 47; 332/9 R, 10

[56] References Cited

U.S. PATENT DOCUMENTS

| | | | |
|---|---|---|---|
| 3,806,647 | 4/1974 | Dohne et al. | 375/54 |
| 4,035,767 | 7/1977 | Chen et al. | 371/43 |
| 4,052,557 | 10/1977 | Chiu et al. | 375/83 |
| 4,077,021 | 2/1978 | Csajka et al. | 332/9 R |
| 4,084,137 | 4/1978 | Welti | 375/42 |
| 4,227,152 | 10/1980 | Godard et al. | 333/18 |
| 4,334,312 | 6/1982 | Yoshida | 329/122 |
| 4,483,012 | 11/1984 | Wei | 371/43 |
| 4,486,882 | 12/1984 | Piret et al. | 371/45 |
| 4,494,239 | 1/1985 | Martin | 370/20 |

FOREIGN PATENT DOCUMENTS 0052463 5/1982 PCT Int'l Appl. .

OTHER PUBLICATIONS

"Channel Coding with Multilevel/Phase Signals", G. Ungerboeck, IEEE Transactions on Information Theory, Jan., 1982, pp. 55-66.
"A Trellis-Coded Modulation Scheme that Includes Differential Encoding for 9600 Bit/sec, Full-Duplex, Two-Wire Modem", Int. Telegraph and Telephone Consultative Committee (CCITT), Aug. 1983.
H. Kobayashi, H. Yanagidaira and K. Kawai, "An Application of Soft Decision to Error Detecting Codes", IEEE Trans., vol. 1 of 3, pp. 293-298; Jun. 19-22, 1983.

Primary Examiner—Benedict V. Safourek
Attorney, Agent, or Firm—William A. Newton

[57] ABSTRACT

Disclosed is a modulation-demodulation system and method for transmitting a plurality of sequentially received information bit sequences, the system including a transmitter having a state machine for expanding by a coding process each information bit sequence into an expanded bit sequence with a coded bit group portion and, in some cases, an uncoded bit group portion. The transmitter further includes a modulator for modulating a carrier signal by one of a plurality of multilevel symbols in a two-dimensional complex plane in response to each sequentially applied expanded bit sequence, with the coded bit group portion being used to specify a subset of the multilevel symbols which when rotated in the complex plane maps upon another subset for each adverse angular rotation and the uncoded bit group portion being used to specify for a selected multiple symbol subset the transmitted multilevel symbol of the carrier signal. The system further includes a receiver having a demodulator and slicer for demodulating and detecting the modulated carrier signal to obtain the expanded bit sequences; a phase rotation detector, coupled to the slicer, for uniquely identifying each adverse angular rotation by analyzing a plurality of sequentially applied coded bit group portions; and a phase corrector, coupled to the phase rotation detector, for compensating for the adverse angular rotation.

26 Claims, 19 Drawing Figures

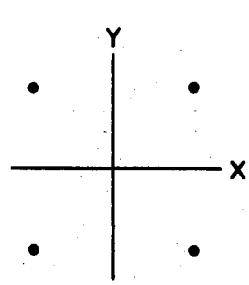
FIG_1_
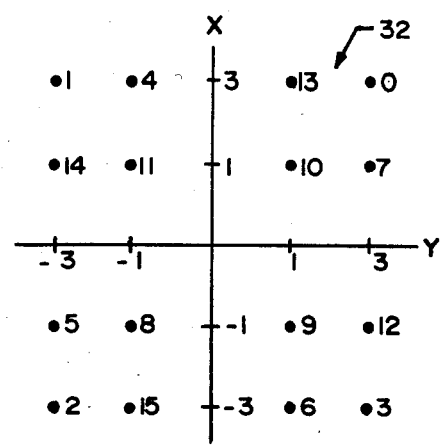
FIG_4_
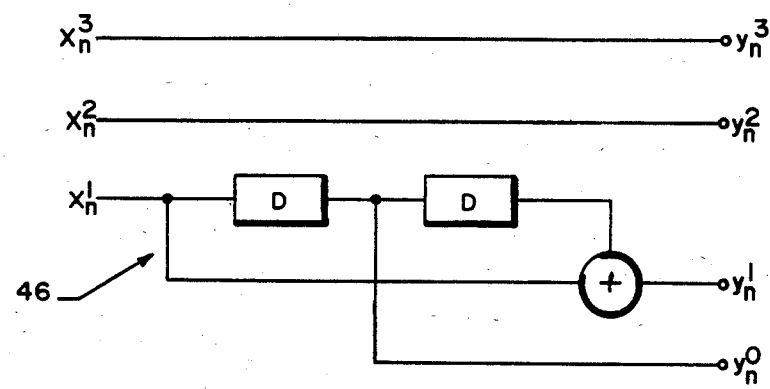
FIG_6_
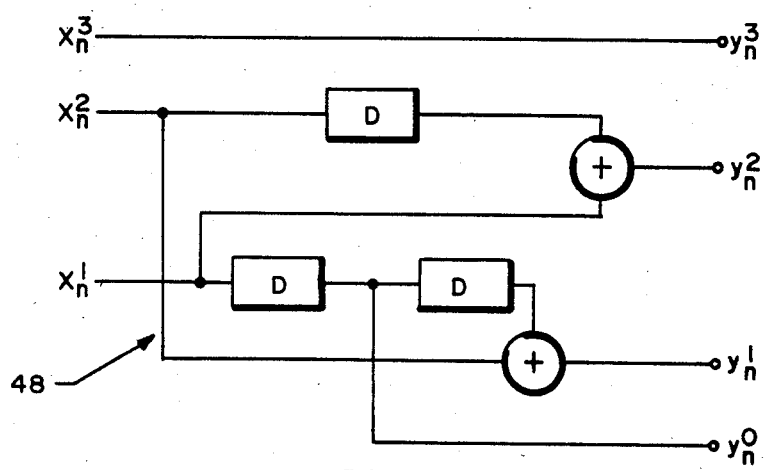
FIG_7_

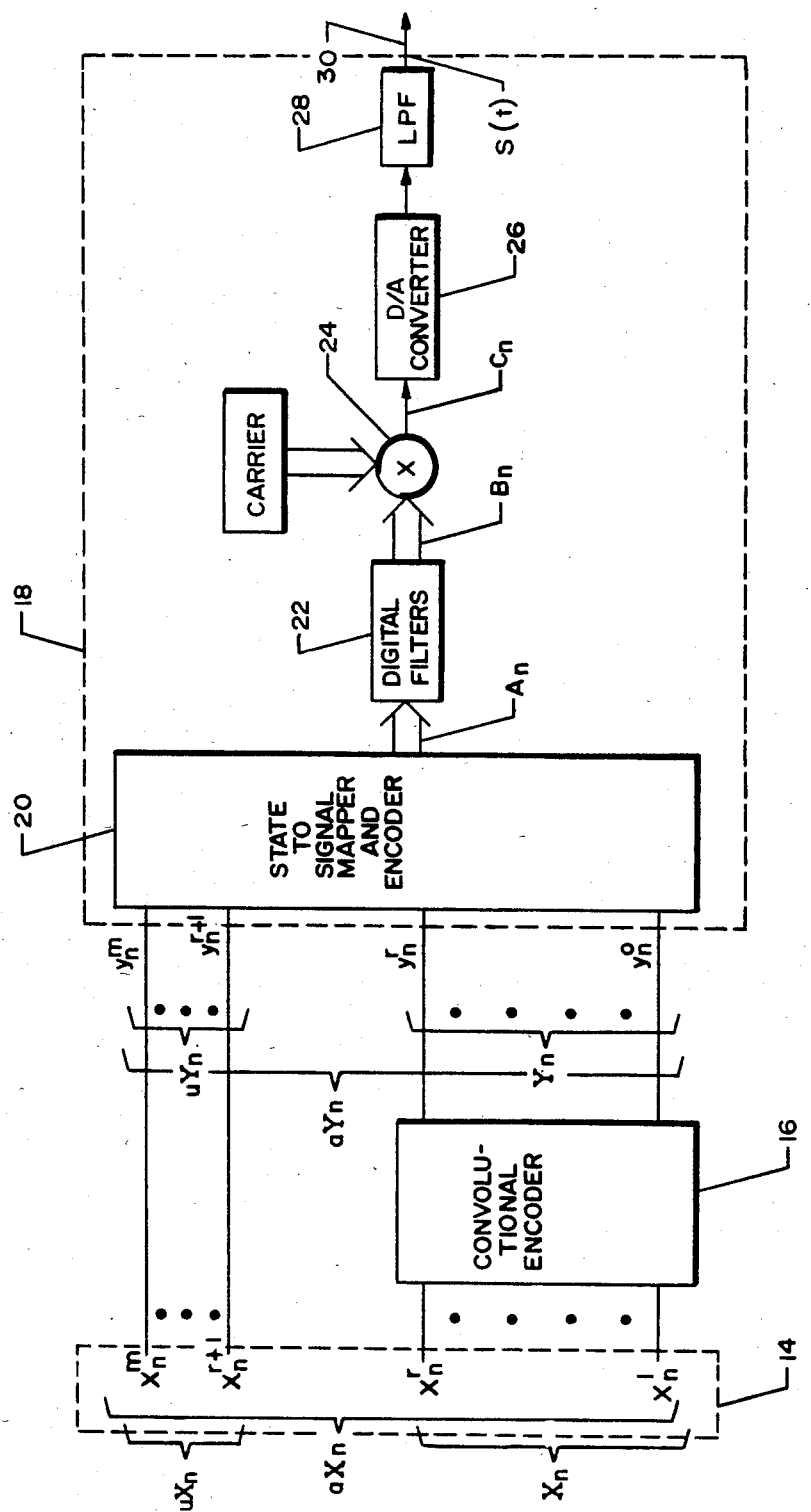
FIG_2

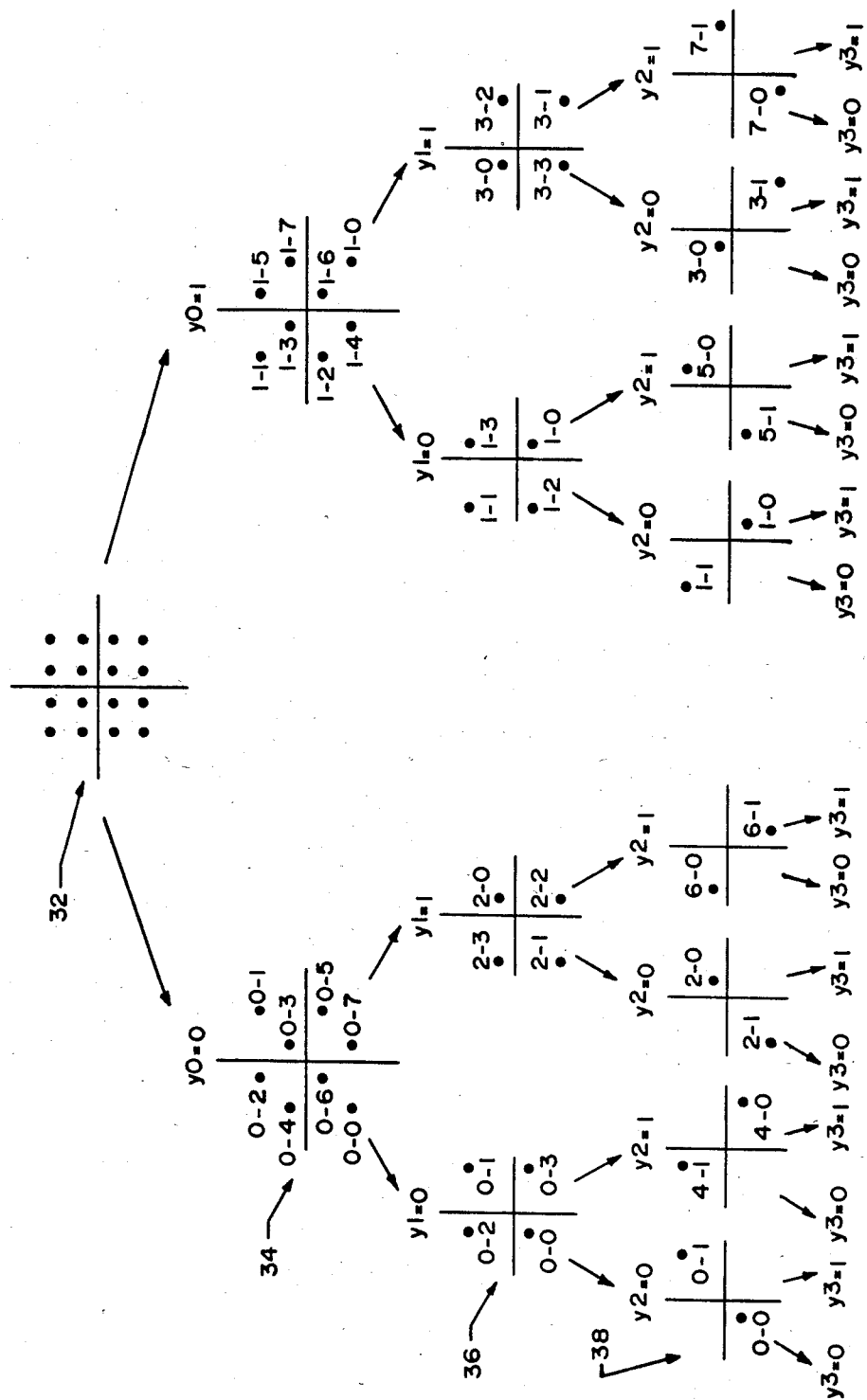
FIG_3

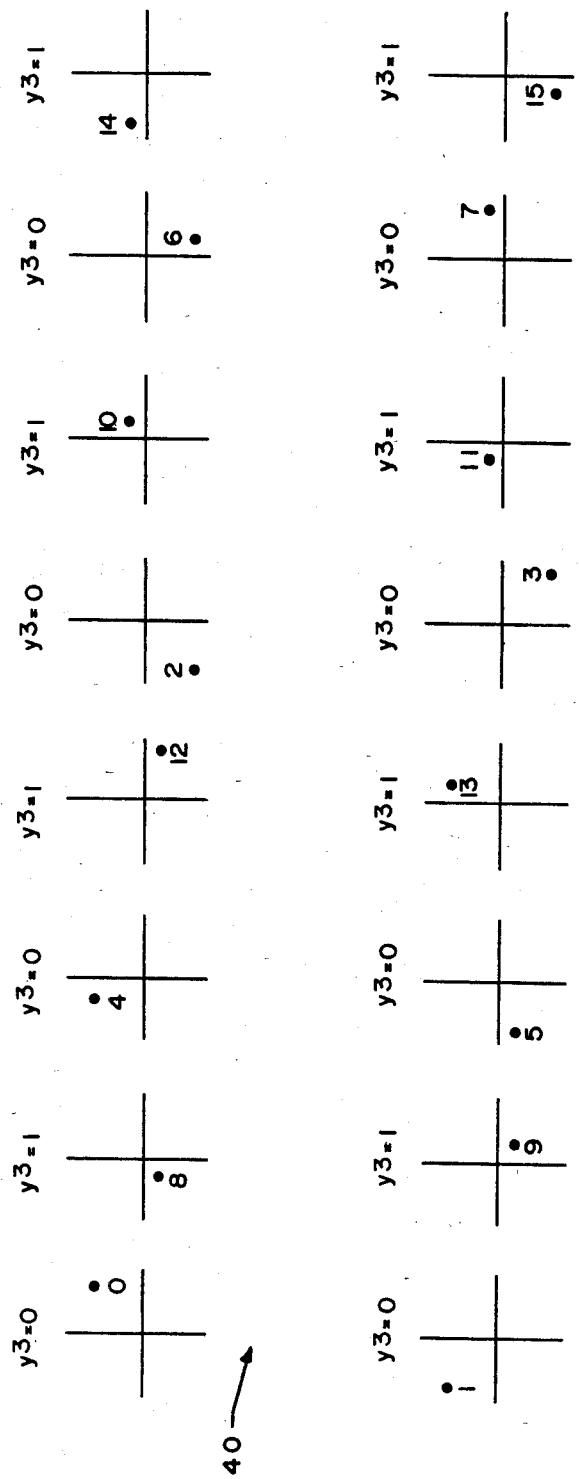
FIG_3A

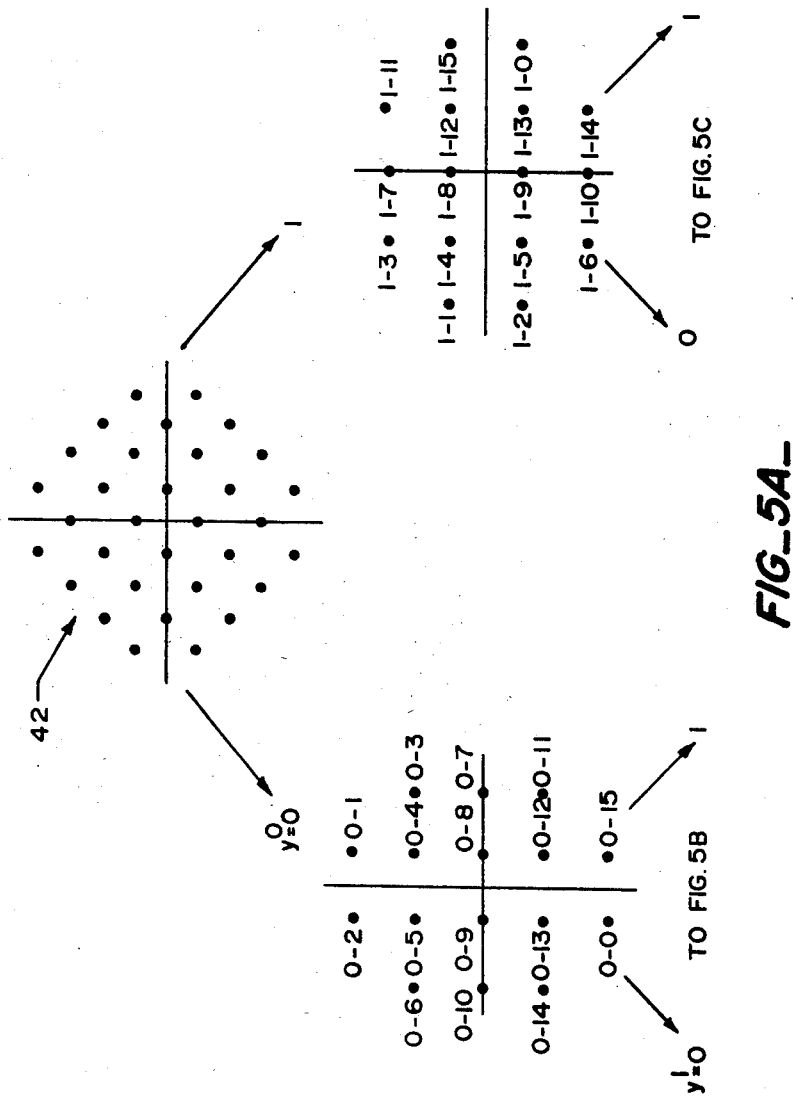
FIG._5A_

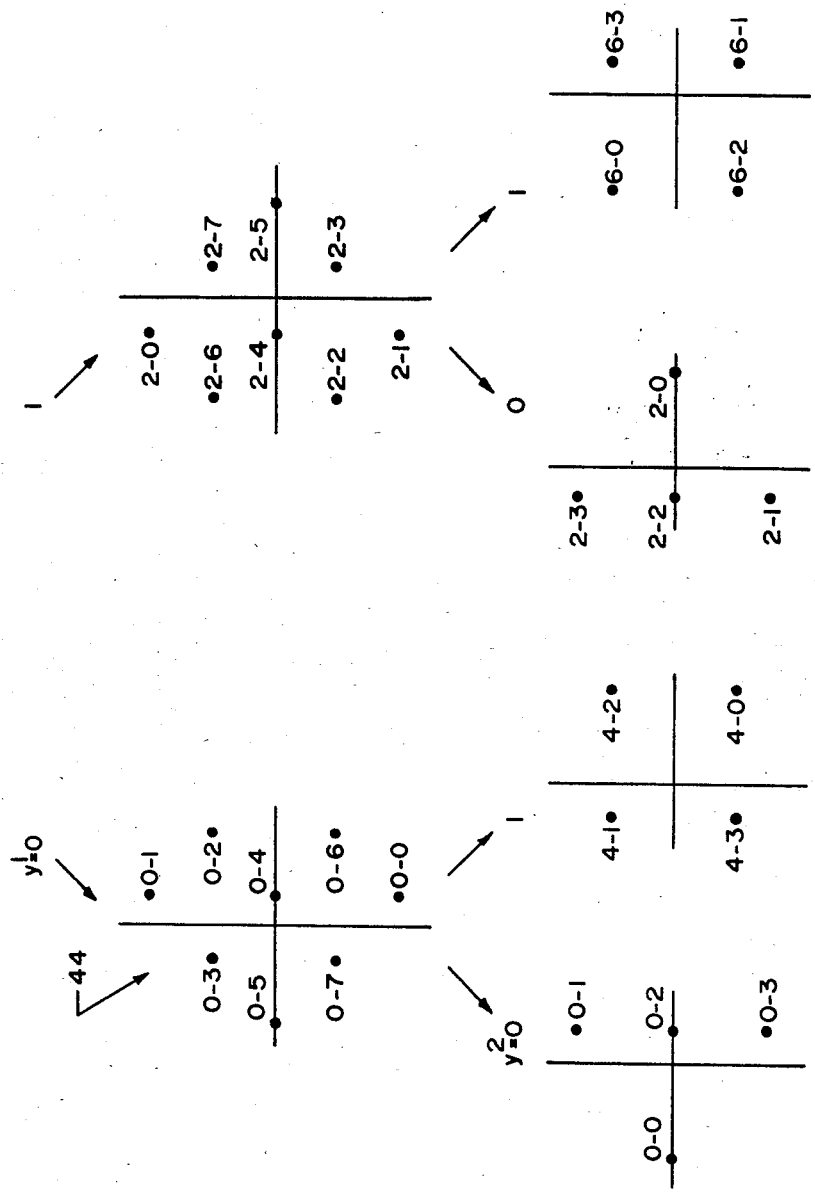
FIG_5B_

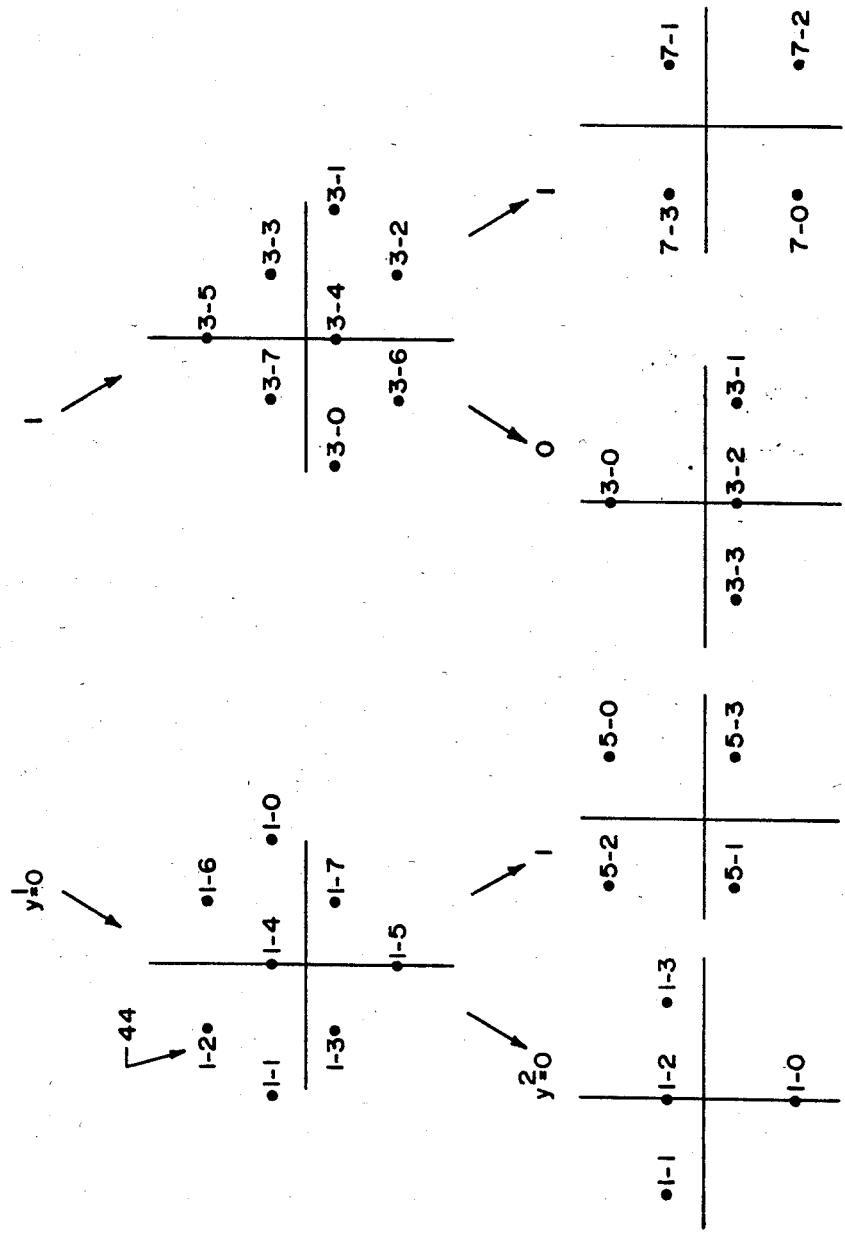
FIG_5C

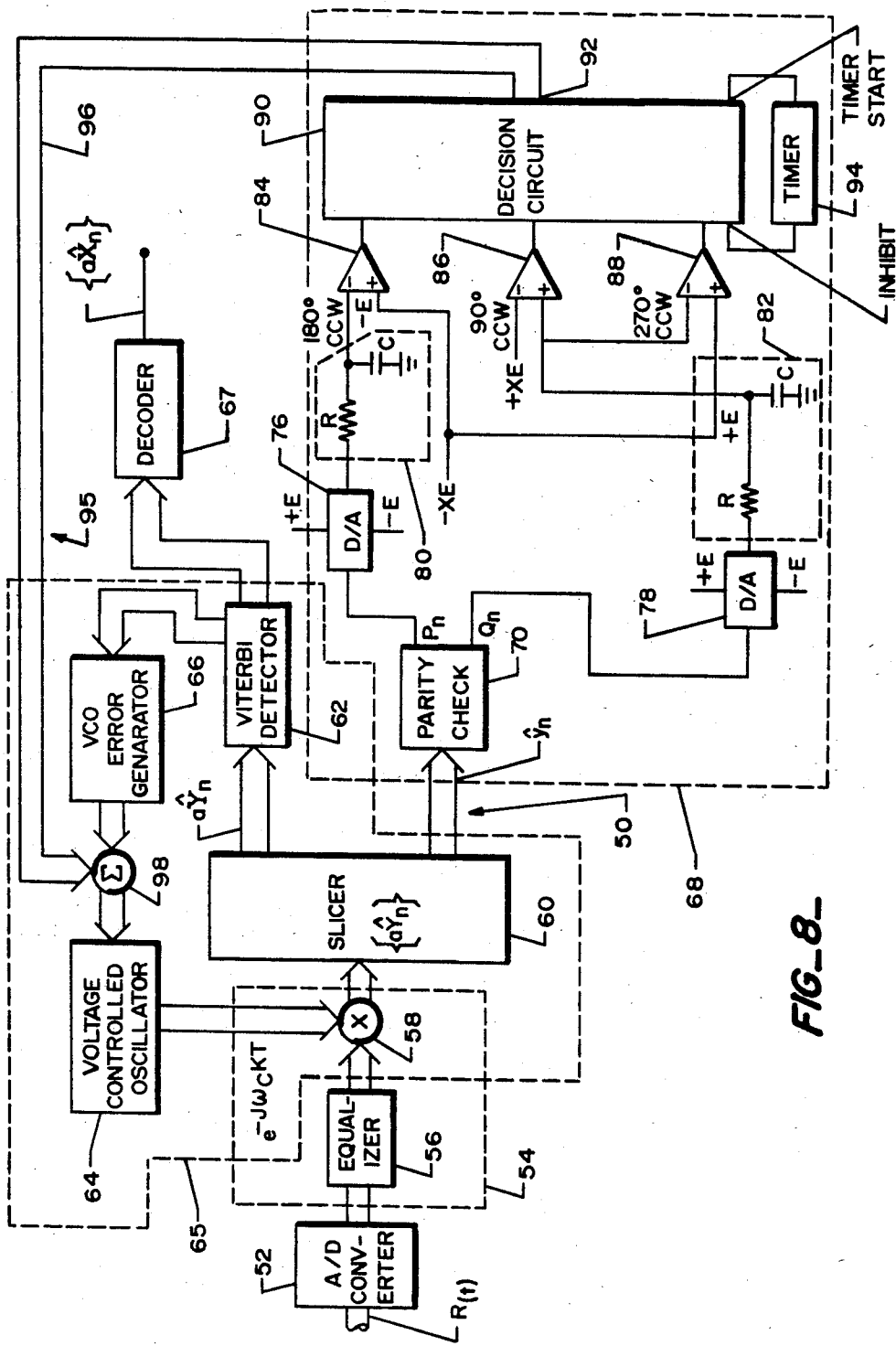
FIG_8

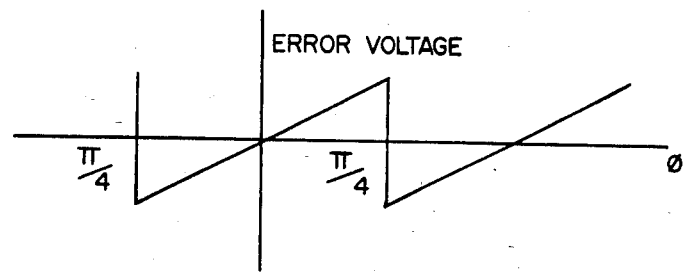
FIG_9_
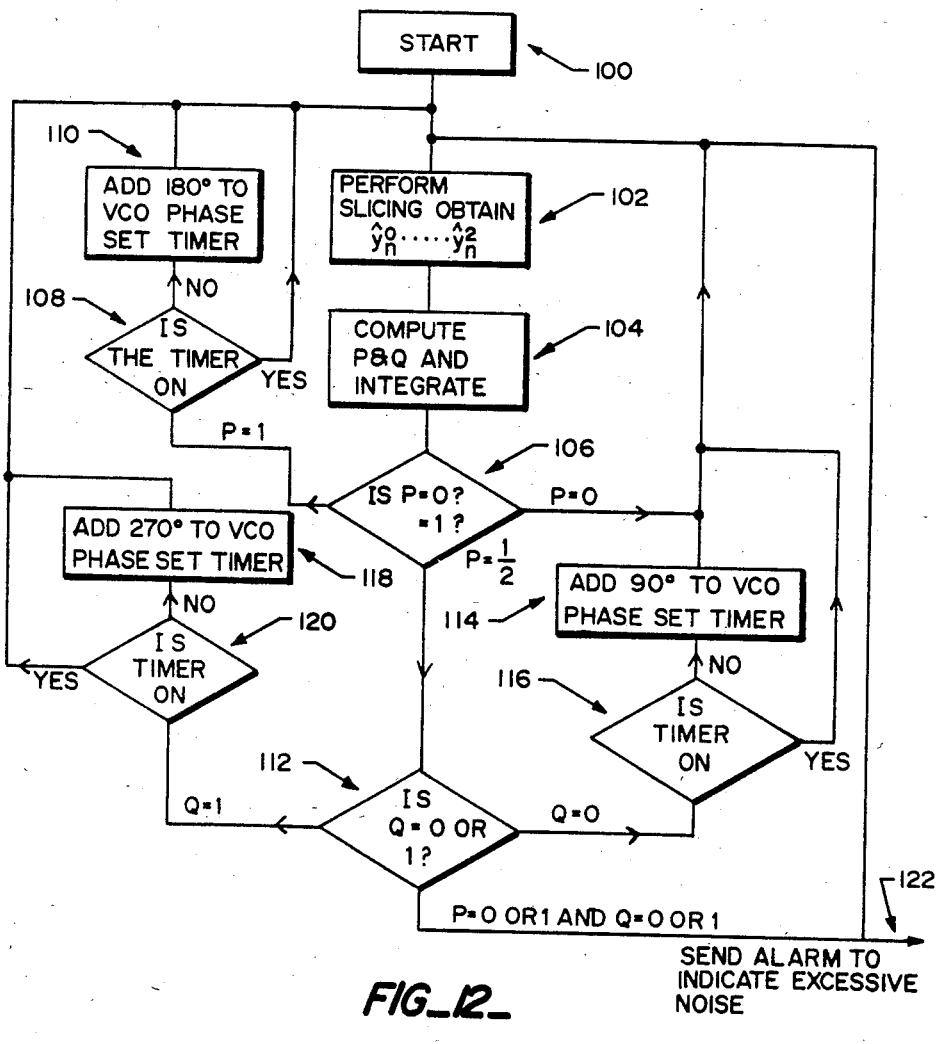
FIG_12_

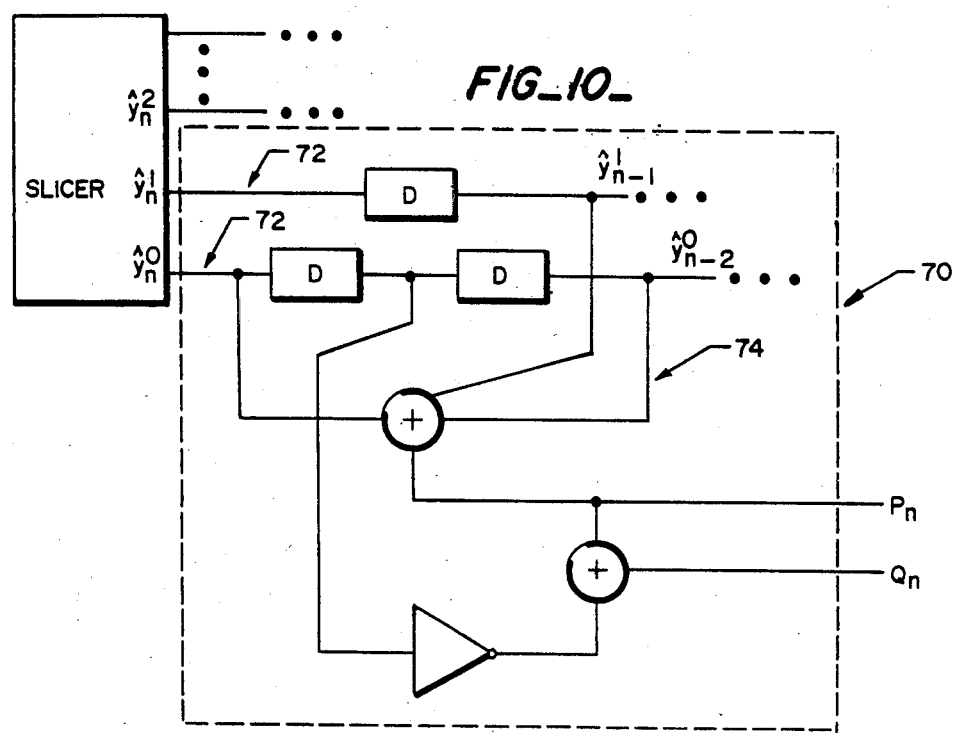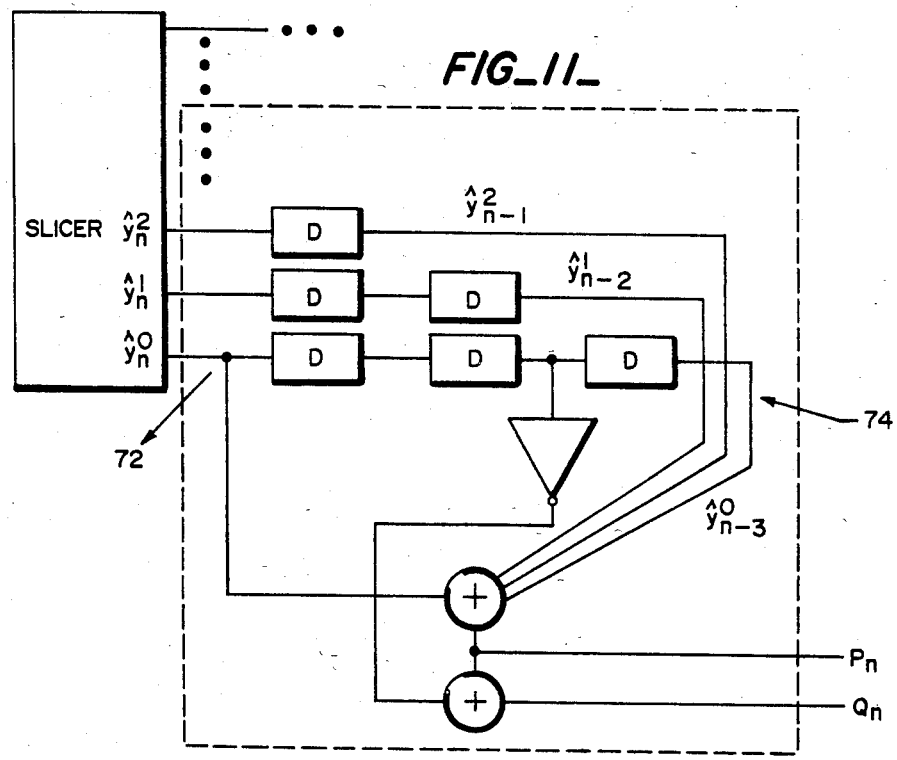

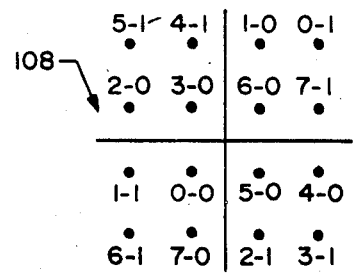
FIG_15_
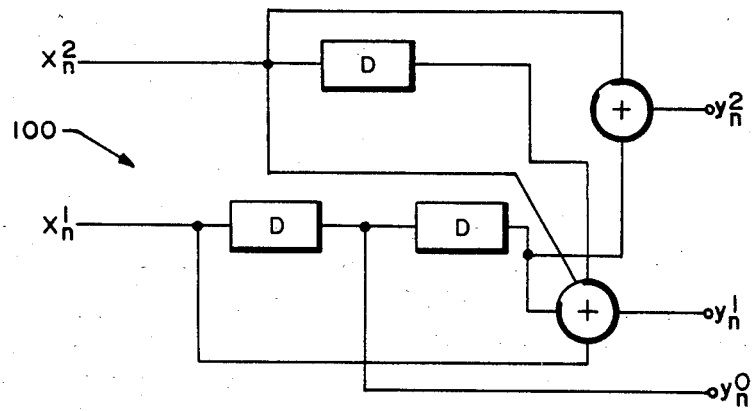
FIG_13A_
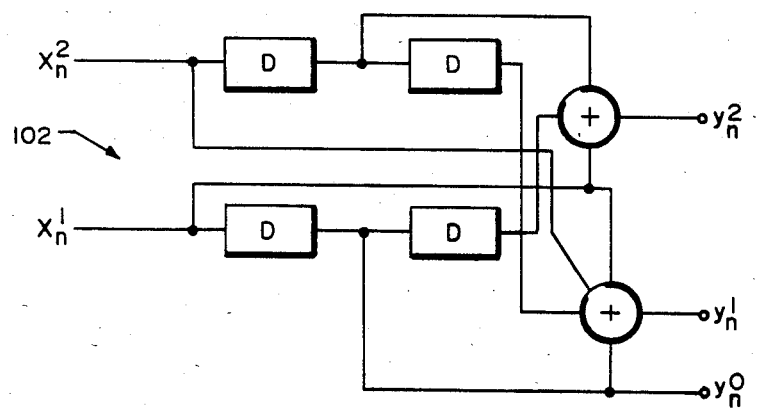
FIG_13B_

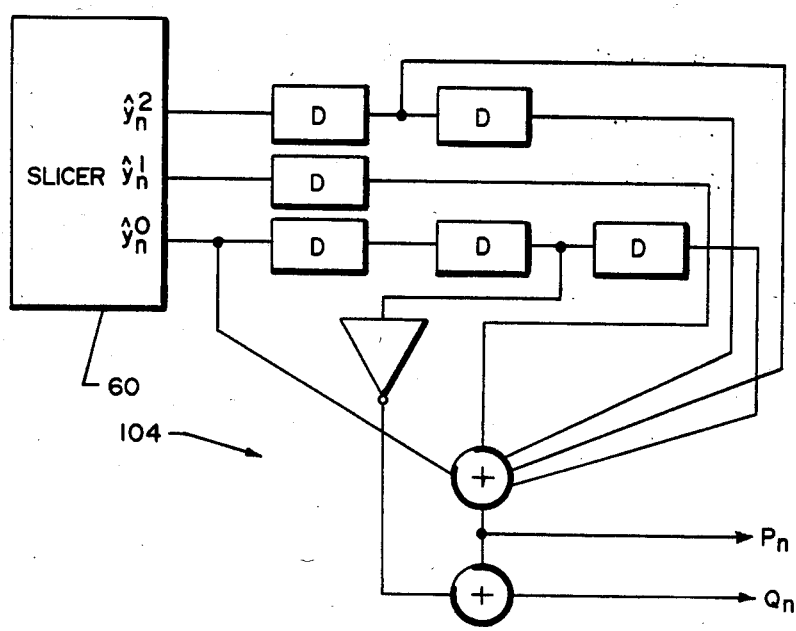
*FIG_14A_*
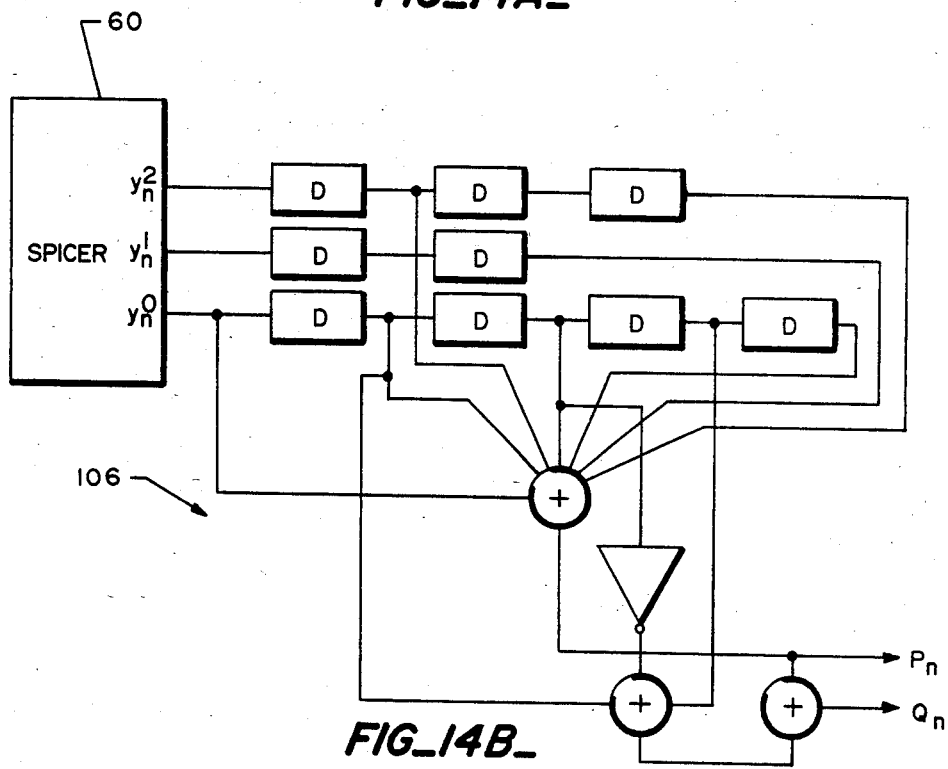
*FIG_14B_*

CARRIER-PHASE ADJUSTMENT USING ABSOLUTE PHASE DETECTOR

BACKGROUND OF THE INVENTION

1. Field of the Invention

The present invention relates to a method and apparatus for adjusting carrier phase for coded two-dimensional signals received by a modem.

2. Description of Prior Art

It is known in the prior art that precoding the data at the transmitter of a modem using a convolutional encoder at the transmitter and performing maximum likelihood (Viterbi) decoding at the receiver improves the signal to noise ratio of the modem, assuming that the major impairment is Gaussian noise. As shown in U.S. Pat. No. 4,077,021 to Csajka et al., binary data is converted to multilevel complex valued symbols, with a convolutional encoder being used to precode the multilevel symbols. These multilevel symbols are represented by signal points in a signal constellation formed in the complex plane. A modulator uses the multilevel symbols to generate a modulated carrier wave signal which is transmitted over a channel to a receiver of a modem that makes a maximum likelihood decision.

In the previously mentioned U.S. Pat. No. 4,077,021, the signal points of the constellation are partitioned into multipoint subsets. This method is developed in more detail in an article entitled "Channel Coding with Multilevel/Phase Signals", G. Ungerboeck, IEEE Transactions on Information Theory, January, 1982, pp. 55–66. According to a method of mapping by set partition, the constellation is divided into subsets through a plurality of subdivisions. During each subdivision, the minimum distance between the points of the subset are increased by $\sqrt{2}$. The minimum distance for each level of subdivision is shown by the following equation:

$$\Delta_0 = \frac{\Delta_1}{\sqrt{2}} = \frac{\Delta_2}{2} = \frac{\Delta_3}{2\sqrt{2}} \quad \text{(Equation A)}$$

In each subdivision the number of signal points in the subset are halved. For example, starting with an original sixteen-point constellation, in the first subdivision, there are two subsets with eight points each. In the second subdivision, there are four subsets with four points each. In the third subdivision, there are eight subsets with two points each and finally, in the fourth subdivision, there are sixteen subsets with one point each. Each subset at a given level of subdivision is identified by a bit group output $Y_n$. The desired level of subdivision dictates the number of bits in the bit group $Y_n$, which is an output provided by the convolutional encoder.

The above-described mapping by set partition technique assumes that the phase of the received carrier signal is known. In telephone line transmission the received signal constellation may be rotated with respect to the transmitted signal constellation, due to phase hits. This rotation may cause the phase of the received signal to jump permanently to a new value. More specifically, if there is a phase hit, the received signal might be rotated by multiples of 90°. If the transmitted signal is characterized by:

$$S(t) = \Sigma a_n \cos(\omega_c t + \theta) - \Sigma b_n \sin(\omega_c t + \theta) \quad \text{(Equation B)}$$

then the received signal is given by:

$$R(t) = \Sigma a_n \cos\left(\omega_c t + \theta + \frac{k\pi}{2}\right) - \Sigma b_n \sin\left(\omega_c t + \theta + \frac{k\pi}{2}\right) \quad \text{(Equation C)}$$

where k can take any one of the values given by $k = \pm 1, \pm 2, \pm 3$, $\omega_c$ is the angular velocity of the carrier wave, and $\theta$ is the phase angle representing the encoded data. Since the phase lock-loop of the modem cannot recognize a carrier phase shift of more than 90°, the receiver will misinterpret the incoming signal. This phase hit problem is illustrated with respect to the signal constellation of FIG. 1 wherein a signal constellation of four points ($\pm 1$) is shown. If the transmitted point is (1, 1), then for a phase rotation of ($\pi/2$):

$$S(t) = 1 \cdot \cos(\omega_c t + \theta) - 1 \cdot \sin(\omega_c t + \theta) \quad \text{(Equation D)}$$

and the received point is:

$$R(t) = 1 \cdot \cos\left(\omega_c t + \theta + \frac{\pi}{2}\right) - 1 \cdot \sin\left(\omega_c t + \theta + \frac{\pi}{2}\right) \quad \text{(Equation E)}$$

$$= -1 \cdot \sin(\omega_c t + \theta) - 1 \cdot \cos(\omega_c t + \theta) \quad \text{(Equation F)}$$

the received point will be interpreted as $(-1, 1)$, which is incorrect.

It is well-known in coding theory that a code is associated with a generator (equation) matrix and a parity equation (matrix). In the previously mentioned article by G. Ungerboeck, the parity check equation is used to analyze properties of convolutional codes and to derive systematic convolutional encoders. Mapping by set partitioning and the parity check equation are used in the implementation of the present invention, although the parity check equation is used in the present invention in a different manner for different objectives.

Another method of overcoming phase rotation is by differential encoding of the input bits. Ungerboeck has shown that in his method of coding one of the bits can be differentially encoded. In a CCITT submission from AT&T Informational Systems entitled "A Trellis-Coded Modulation Scheme that Includes Differential Encoding for 9600 Bit/sec, Full-Duplex, Two-wire Modem", dated August 1983, there is disclosed a method of compensating for phase rotations by multiples of 90° using differential encoding.

SUMMARY OF THE INVENTION

The present invention is directed toward an improved modulation-demodulation system and method for transmitting a plurality of information bit sequences, the system including a transmitter having a state machine means for transforming by a coding process each information bit sequence into an expanded bit sequence having at least a coded bit group portion, and the transmitter further having modulated signal generating means for modulating a carrier signal to assume one of a plurality of multilevel symbols in response to each sequentially applied expanded bit sequence, with the coded bit group portion selecting one of a plurality of subsets of the multilevel symbols, the multilevel symbols being capable of representation in a two-dimensional complex plane, and the system further including a receiver having demodulation and slicer means for obtaining the expanded bit sequences from the modulated carrier signal, wherein the improvement comprising: the modulated signal generating means having the subsets arranged and identified so that, when rotated in the complex plane by one of a plurality of adverse angular rotations, each subset substantially maps upon a unique, predetermined subset other than itself for each of the adverse angular rotations; phase rotation detection means, coupled to the demodulation and slicer means, for uniquely identifying each adverse angular rotation from a plurality of sequentially applied coded bit group portions; and phase correction means, coupled to the phase rotation detection means, for compensating for the adverse angular rotation.

The modulated carrier generating means of the present invention produces the subsets of the multilevel symbols which follow a predetermined mapping rule that defines the mapped-upon subsets for a given adverse angular rotation. The mapping rule used in the present invention requires that the subsets be defined, arranged and identified so that (1) the subsets, when rotated in the complex plane by an adverse angular rotation, substantially, i.e., within a few degrees, map upon a unique subset other than itself for each adverse angular rotation and (2) that for each adverse angular rotation the mapped-upon subset is predetermined, i.e., has been previously ascertained so that the hereinafter described parity check equation can be used.

In the receiver, the phase rotation detection means according to the invention uses the fact that each coded bit group portion from the state machine is associated with a given subset having the above-described characteristics and includes means for implementing the following $P_n(j)$ function to compute $j$ ($j \geq 0$) from a plurality of the sequentially received coded bit group portions:

$$P_n(j) = [y_n^r(D) \ldots y_n^1(D), y_n^0(D)] \cdot [H^r(D) \ldots H_n^1(D), H^0(D)]^T$$

where:
- $y(D)$ represents each bit of the coded bit sequence portion
- $H(D)$ represents each term of a parity check matrix
- $n$ is the symbol period
- $j > 1$ indicates adverse rotation
- $j = 0 = 0°$ angular rotation
- $j = 1$ with 90° rotation, $j = 2$ with 180° rotation, and $j = 3$ with 270° rotation.

The phase rotation detection means further includes means for implementing the following $Q(j)$ function for at least each calculated $P_n(j)$ value that does not provide a unique identifying value for a given adverse angular rotation:

$$Q_n(j) = P_n(j) \oplus P_n(i),$$

where $i = 1$ (90° rotation) or 3 (270° rotation)

The combination of the $P(j)$ and $Q(j)$ functions provides a unique identifying value for each of the adverse angular rotations and for K·360° angular rotations ($K \geq 0$). Thereafter, the phase correction means can correct for the adverse angular rotation in a number of ways.

BRIEF DESCRIPTION OF THE DRAWINGS

Further objects and advantages of the present invention will become apparent as the following description proceeds, taken in conjuction with the accompanying drawings in which:

FIG. 1 shows an illustrative four-point complex plane signal constellation.

FIG. 2 is a generalized diagram of a transmitter of a modem implementing the present invention.

FIG. 3 shows the partitioning by subset of an illustrative sixteen-point constellation using the preferred subset number assignment of the present invention. FIG. 3A shows partitioning by subset of the signal constellation of FIG. 3 at the fourth level of subdivision.

FIG. 4 shows the assignment of convolutional coder output defining subset numbers to the sixteen-point constellation illustrated in FIG. 3.

FIGS. 5A through 5B shows the partitioning by subset of an illustrative thirty-two point constellation using the preferred subset number assignment of the present invention.

FIG. 6 is a schematic diagram of a four state convolutional encoder that can be implemented as the convolutional encoder shown in FIG. 2.

FIG. 7 is a schematic diagram of an eight state convolutional encoder that can be implemented as the convolutional encoder shown in FIG. 2.

FIG. 8 is a generalized diagram of a receiver of a modem implementing the present invention.

FIG. 9 is a graph of the phase error as a function of the error voltage.

FIG. 10 illustrates a specific hard-wired implementation of the parity check means shown in FIG. 8.

FIG. 11 illustrates another specific hard-wired implementation of the parity check means in FIG. 8.

FIG. 12 is a simplified flow diagram of the phase rotation detection means and phase rotation correction means shown in FIG. 8.

FIG. 13A is a schematic diagram of an eight-state convolutional encoder that can be implemented as the convolutional encoder shown in FIG. 2.

FIG. 13B is a schematic diagram of a sixteen-state convolutional encoder that can be implemented as the convolutional encoder shown in FIG. 2.

FIG. 14A illustrates a specific hard-wired implementation of the parity check means shown in FIG. 8 which is used in combination with the convolutional encoder of FIG. 13A.

FIG. 14B illustrates a specific hard-wired implementation of the parity check means shown in FIG. 8 which is used in combination with the convolutional encoder of FIG. 13B.

FIG. 15 shows the signal constellation with the subset numbers being defined by TABLE 5.

DETAILED DESCRIPTION OF THE PREFERRED EMBODIMENTS

Referring to FIG. 2, there is shown a schematic representation of the generalized functional structure of that portion of a transmitter of a modem which is necessary to illustrate the implementation of present invention. A data source 14 provides a stream of digital data i.e., information bit sequences, to the modem 12 so that for every symbol period of T seconds there is an input binary sequence $aX_n$, with n being the time index of symbol period and nT being the time of occurrence of the $n^{th}$ symbol period. In the preferred embodiment, each input binary sequence $aX_n$ is divided into two bit group portions, a bit group $X_n$ consisting of bits $(x_n^1 \ldots x_n^r)$ to be coded and a bit group $uX_n$ consisting of bits $(x_n^{r+1} \ldots x_n^m)$ that is not to be coded. Coding is accomplished by a state machine 16 which preferably takes the form of a convolutional encoder. In response to the bit group $X_n$, which has r bits, the convolutional encoder generates a redundant output bit group $Y_n$ which has (r+1) bits. The convolutional encoder limits the allowed transitions between a fixed number of internal states of the convolutional encoder. A convolutional encoder with a constraint length d can be represented by a d-stage shift register with outputs of selected stages being added modulo-2 to form the encoded symbols of the coded bit group $Y_n$. The convolutional encoder is defined as having $(2)^d$ internal states. An uncoded output bit group $uY_n$ consists of the uncoded bit group $uX_n$, which is unmodified, and an expanded bit sequence $aY_n$ is defined to include bit groups $uY_n$ and $Y_n$ and has (m+1) bits. As will be seen hereinafter, in one implementation there may be no bit groups $uX_n$ and $uY_n$. The lines for each bit of the sequences $aX_n$ and $aY_n$ are not shown in FIG. 2, with dots indicating that there can be more lines for additional bits not shown, since FIG. 2 is intended to be generic to numerous possible bit sequence arrangement.

In the preferred embodiment, a modulated signal generating means 18 receives the expanded bit sequence $aY_n$. In response to the coded bit group $Y_n$, the modulated signal generating means 18 uses a state-to-signal mapper and encoder 20 to select one of $2^{r+1}$ predetermined subsets of $2^{m+1}$ complex valued multilevel symbols (the different amplitudes and phases of the carrier), which can be represented as points of the signal constellation in the complex plane. The uncoded bit group $uY_n$ is used to determine which member (designated as $A_n$) of the selected subset of complex symbols will be an output from the encoder 20. The complex symbol $A_n$ is shown being filtered by suitable bandwidth-limiting digital filters 22 to provide baseband signal shaping in accordance with conventional techniques. The filtered output signal $B_n$ is received by a suitable modulator 24 to provide a modulated output signal $C_n$.

As is well-known in the art, although the digital filters 22 are shown as baseband filters, a passband filter placed at the output of the modulator 24 could be used, or alternatively, a look-up table can be used in place of the filters 22 and the modulator 24, with the look-up table having stored therein modulated, filtered, digitized waveforms as shown in U.S. Pat. No. 3,988,540. Thereafter, the signal $C_n$ is processed by the D/A converter 26 and low-pass filter 28 to provide an analog modulated carrier signal, S(t), i.e., a channel signal (defined by Equation B), to a transmission line 30. The number of input bits in the bit group $X_n$ will depend upon the number of subsets into which the original signal constellation of the transmitter 12 is divided and the number of bits in the uncoded bit group $uX_n$, if any, will depend upon the number of points in each subset. In general, the generalized system components shown in FIG. 2 are to be found in known modem design techniques as illustrated in U.S. Pat. No. 4,077,021, which is incorporated by specific reference thereto.

As previously mentioned, the encoder 20, in response to the coded bit group $Y_n$, selects a subset of symbols. The defining of subsets and their assignment to specific coded bit groups can be, for example accomplished by the previously described and known technique of "mapping by set partition". FIGS. 3 and 3A illustrates mapping by set partition for a sixteen-point constellation 32 shown in a complex plane representation. The constellation is divided into $2^{r+1}$ subsets, with each subset being identified in FIGS. 3 and 3A by a subset number determined by the equation:

$$Y_n = \text{Subset No.} = y^0 \cdot 2^0 + y^1 \cdot 2^1 \ldots + y^r \cdot 2^r \quad \text{(Equation 1a)}$$

Here, $Y_n$ is used to denote the bit group $(y^0 \ldots y^r)$ as well as the decimal value of the set given by Equation 1a. As will be seen hereinafter, when the subsets $Y_n$ of the original constellation are rotated by ±90° or 180°, they will map upon other subsets of the original constellation, such mapped-upon subsets being designated as $Z_n$. Subset number $Z_n$ is given by the following equation:

$$Z_n = z^0 \cdot 2^0 + z^1 \cdot 2^1 \ldots + z^r \cdot 2^r \quad \text{(Equation 1b)}$$

In FIG. 3 each constellation point is identified by a pair of numbers separated by a hyphen, with the first number being $Y_n$ which identifies the subset and with the second number (hereinafter referred to as point number) identifying the signal point in the constellation. There are four levels of subsets, identified by numbers 34, 36, 38 and 40, which are created by four subdivisions of the points of constellation 32. At the fourth level 40 of subsets shown in FIG. 3A, there is only one point per subset; hence, there is only a subset number associated with each signal point.

As with the prior art, during each subdivision the minimum distance between the points of the subset are increased by $\sqrt{2}$, as shown by the following equation:

$$\Delta_0 = \frac{\Delta_1}{\sqrt{2}} = \frac{\Delta_2}{2} = \frac{\Delta_3}{2\sqrt{2}} \ldots \quad \text{(Equation 2)}$$

In the present invention, the points of the constellation 32, which has 90° symmetry, are subdivided into subsets and the subsets are arranged relative to each other according to a methodology that creates predetermined and known relationships between the subsets of the unrotated constellation 32 and the subsets of the constellation 32 rotated by $\phi$ of 90°; 180°, and 270°. When rotation by $\phi$ is referred to, as a matter of convenience, rotation is assumed to be in counterclockwise (ccw) direction. One suitable methodology for creating the above-described predetermined and known relationships will be described in detail hereinafter with respect to FIGS. 3 through 5.

Referring to FIG. 4, the results of the fourth subdivision in FIG. 3A are superimposed on the signal constellation 32 so as to assign a subset number to each point in the constellation. Additionally, the transmitted voltages are shown on the X and Y axes so as to give rectangular Cartesian coordinates (±X, ±Y) for each complexed-valued signal point (symbol) of the constellation. TABLE 1 shows the mapping between $Y_n$ and $Z_n$ when there is a carrier shift. Each hyphened pair of numbers represent $Y_n$-$Z_n$, e.g., for 90° rotation, 0 is rotated to 1.

TABLE 1

| 90° Carrier Shift | | | |
|---|---|---|---|
| 0→1 | 4→5 | 8→9 | 12→13 |
| 1→2 | 5→6 | 9→10 | 13→14 |
| 2→3 | 6→7 | 10→11 | 14→15 |
| 3→0 | 7→4 | 11→8 | 15→12 |
| 180° Carrier Shift | | | |
| 0⇌2 | 4⇌6 | 8⇌10 | 12⇌14 |
| 1⇌3 | 5⇌7 | 9⇌11 | 13⇌15 |
| 2⇌0 | 6⇌4 | 10⇌8 | 14⇌12 |

TABLE 1-continued

| 3⇌1 | 7⇌5 | 11⇌9 | 15⇌13 |
|---|---|---|---|
| 270° Carrier Shift | | | |
| 0→3 | 4→7 | 8→11 | 12→15 |
| 1→0 | 5→4 | 9→8 | 13→12 |
| 2→1 | 6→5 | 10→9 | 14→13 |
| 3→2 | 7→6 | 11→10 | 15→14 |

Referring to FIG. 4, using rectangular Cartesian coordinates, each constellation point, i.e., subset, having non-rotated coordinates will obtain the following new coordinates, with rotation as shown in TABLE 2.

TABLE 2

| | COORDINATES | | |
|---|---|---|---|
| LOCATION A NON-ROTATED | LOCATION B 90° ROTATED | LOCATION C 180° ROTATED | LOCATION D 270° ROTATED |
| (+X, +Y) | (−Y, +X) | (−X, −Y) | (+Y, −X) |
| (+X, −Y) | (+Y, +X) | (−X, +Y) | (−Y, −X) |
| (−X, −Y) | (+Y, −X) | (+X, +Y) | (−Y, +X) |
| (−X, +Y) | (−Y, −X) | (+X, −Y) | (+Y, +X) |

In the examples described herein, "non-rotated coordinates" and "non-rotated subsets" and "0° angular rotation" refer to multilevel symbols and subsets which have substantially K·360° rotations, where K is an integer including zero. This includes no rotation and rotations which are positive and negative multiples of 360°, but the two cannot be distinguished.

Applying the exemplary mapping rules used with the present invention, a constellation point is initially selected to be assigned the subset number 0 (Location A). Thereafter, using the appropriate row of the above TABLE 2, the subsets in Locations B, C, and D are consecutively identified with subset numbers 1, 2 and 3. In other words, having selected the location for subset 0, the location of subsets 1, 2 and 3 are determined. To get the proper d free, the position of subset 4 is fixed with respect to subset 0. Once this is done, subsets 5, 6, and 7 are determined and so on until all subsets are assigned numbers. As can be seen from TABLES 1 and 2, the point assignment revolves on a modulo-4 basis. Although one point subsets of FIG. 3A, which require no uncoded bits, are useful for illustrating the number assignment of subsets, they are not normally the preferred choice. The above point assignment will hereinafter be extended to subsets having more than one point.

As shown in FIG. 3, the constellation 32 is first divided into two subsets 0 and 1, shown at the first level of subsets 34. The points in the subsets on the first level not only obey the distance property of Equation 2, but the points have another property, i.e., by rotating the axes by 90°; subset 0 can be mapped onto subset 1. By rotating subset 0 by 180°, subset 0 is mapped onto itself and similarly by rotating subset 0 by 180°, subset 1 is mapped onto itself. With a second subdivision, subset 0 on the first level 34 of subsets is subdivided into two subsets 0 and 2 on the second level 36 of subsets, such that the distance property of Equation 2 is satisfied. Additionally, subset 1 on the first level 34 of subsets is subdivided into two subsets 1 and 3 on the second level 36 of subsets, such that the distance property of Equation 2 is satisfied. By rotating subset 0 by 90°, subset 0 can be mapped onto subset 1 and by rotating subset 1 by 90°, subset 0 can be mapped onto subset 2 and so on as shown in TABLE 3.

TABLE 3

| NON-ROTATED SUBSET ($Y_n$) | 90° ROTATION ($Z_n$) | 180° ROTATION ($Z_n$) | 270° ROTATION ($Z_n$) |
|---|---|---|---|
| 0 | 1 | 2 | 3 |
| 1 | 2 | 3 | 0 |
| 2 | 3 | 0 | 1 |
| 3 | 0 | 1 | 2 |

In TABLE 3 above, the non-rotated subsets in column one show the subsets as they are with no phase rotation, whereas columns two through four show the locations of the subsets of column one after phase rotation in terms of the unrotated numbers of the subsets of column one. Additionally, TABLE 2 is equally applicable to the subsets on level 36 in that each point in the subset obeys the exemplary mapping rule of TABLE 2.

Referring to the eight subsets of the third level 38 of subsets shown in FIG. 3, the subsets have been numbered to obey the same subset mapping rule as described above and as shown in TABLES 2 and 4.

TABLE 4

| NON-ROTATED SUBSET ($Y_n$) | 90° ROTATION ($Z_n$) | 180° ROTATION ($Z_n$) | 270° ROTATION ($Z_n$) |
|---|---|---|---|
| 0 | 1 | 2 | 3 |
| 1 | 2 | 3 | 0 |
| 2 | 3 | 0 | 1 |
| 3 | 0 | 1 | 2 |
| 4 | 5 | 6 | 7 |
| 5 | 6 | 7 | 4 |
| 6 | 7 | 4 | 5 |
| 7 | 4 | 5 | 6 |

Examining the point numbers applied to each point of a subset (second number in FIG. 3), regardless of the 90°, 180°, or 270° rotation, each point number of the subset maps upon the same point number, e.g., 0—0 when rotated by 90° maps onto 1-0 and when rotated by 180° maps upon 2-0 and so on. Under this point numbering system, the point numbers (uncoded bits $uY_n$) remain invariant when the axes are rotated. For a sixteen-point constellation, the third level of subsets 38 is normally desirable; hence, leading to a convolutional encoder having a two bit $uY_n$ and a three bit $Y_n$. The fourth level 40 of subsets has already been described with respect to TABLES 1 and 2. TABLE 1 could have been formated in the same manner as TABLES 3 and 4.

FIG. 5 illustrates implementation of the above-described illustrative mapping rule to a thirty-two point constellation 42. The constellation 42 can be subdivided three times into eight subjects of four points each at a third level 44 of subsets. The subsets follow the mapping rule of TABLE 2. Likewise, the point number of each point in the subset remains invariant with ±90° and 180° rotation of axes. The constellations 32 and 42 are illustrative of only two constellations of many to which the exemplary mapping rule of the present invention can be applied. Two other commonly used constellations have 64 points and 128 points with 90° symmetry.

The relationship of the mapped-upon subsets $Z_n$, caused by the rotated constellation, to the subsets $Y_n$ in the original non-rotated constellation, as shown in the above tables and examples, will be described mathematically hereinafter. Assume the following:

$$4(r-1) \leq Z_n \leq 4r-1; r=1, 2, \ldots \qquad \text{(Equation 3a)}$$

$$4r-4 \leq Y_n \leq 4r-1 \quad \text{(Equation 3b)}$$

then, $$Z_n = (Y_n+1) \bmod (r\cdot 4)+(r-1)\cdot 4 \text{ for } 90° \quad \text{(Equation 4a)}$$

$$Z_n = (Y_n+2) \bmod (r\cdot 4)+(r-1)\cdot 4 \text{ for } 180° \quad \text{(Equation 4b)}$$

$$Z_n = (Y_n+3) \bmod (r\cdot 4)+(r-1)\cdot 4 \text{ for } 270° \quad \text{(Equation 4c)}$$

The above-described mapping rule merely illustrates one of many possible mapping rules that can be used in the present invention. The only requirements of the mapping rules are that (1) the subsets, when rotated in the complex plane by an adverse angular rotation, substantially, i.e., within a few degrees, map upon a unique subset other than itself for each adverse angular rotation and (2) that for each adverse angular rotation the mapped-upon subset be known so as to allow for the parity check calculations to be described hereinafter. In the above examples, the adverse angles are substantially ±90° and 180°, which are a function of having two perpendicular symmetry axes, the X-axis and the Y-axis. In the complex plane with the signal constellation having 90° symmetry with respect to these axes, the signal points of each quadrant, when rotated about the origin, can be mapped upon the signal points of any other quadrant. However, it is contemplated that variations in the number of symmetry axes can be made without departing from the spirit and scope of the invention as defined in the appended claims. For example, other signal constellations used in the prior art have had three and five symmetry axes, thereby giving 120° and 72° symmetries in the signal constellation, respectively. 120° symmetry gives adverse angular rotations of 120° and 240° and 72° symmetry gives adverse angular rotations of 72°, 144°, 216° and 288°. Hence, the term "adverse angular rotation" refers to all angular rotations that have to be removed.

By using the above-described exemplary mapping rule with the hereinafter described implementations of the present invention, adverse angular rotations can be detected with signal constellations rotated by ±90° or 180° using in part the previously mentioned parity check equation in the receiver of the modem. To derive the specific parity check equation for a given subset arrangement and a given convolutional encoder, the parity check matrix for the convolutional encoder must be calculated. Using polynomial notation, where there is no rotation, the receiver's binary output sequence $\hat{Y}(D)$ must satisfy the generalized parity check Equation 5:

$$P_n = [\hat{y}_n^r(D) \ldots \hat{y}_n^1(D), y_n^0(D)] \cdot \quad \text{(Equation 5)}$$
$$[H^r(D) \ldots H^1(D), H^0(D)]^T = 0$$

where H(D) is the parity check matrix and the bits of the receiver's binary output sequence $\hat{Y}(D)$ are shown as a function of a delay operator D. The receiver sequence is differentiated from the transmitted sequence by the use of a hat on top of the variable, e.g., (Y and $\hat{Y}$). It will be seen hereinafter that the use of Equation 5 has been expanded by the present invention to define a function P(j), where $0 \leq j \leq 3$. When j=0, this indicates K·360° rotation and each non-zero value of j relates to an adverse angular rotation $\phi$. For the example described hereinafter, j=1 when $\phi=90°$, 2 when $\phi=180°$ and 3 when $\phi=270°$. The value of Pn will depend upon the value of j and to show this dependence, Pn will be written as $P_n(j)$. The function $P_n(j)$ will provide a non-zero output when there exists one of the adverse rotations. In the examples described hereinafter 90° and 270° cause $P_n(j)$ to have the same output; hence, to have a unique predetermined output for each adverse angular rotation, the following calculation must be performed for j=1 or j=3:

$$Q_n(j) = P_n(j) \oplus P_n(i), \quad \text{(Equation 5a)}$$

where:
j = 0, 1, 2, 3
i = 1 or 3
$P_n(0)$, $Q_n(0)$ are the functions for 0° rotation
$P_n(1)$, $Q_n(1)$ are the functions for 90° rotation
$P_n(2)$, $Q_n(2)$ are the functions for 180° rotation
$P_n(3)$, $Q_n(3)$ are the functions for 270° rotation As before, to show the dependence of $Q_n$ on j, Q is written as Q(j).

In general, after $P_n(j)$ is calculated, $Q_n(j)$ will be calculated at least for any $P_n(j)$ which does not give a unique value. This means the unique identifying value for j can be found from the combined values of $Q_n(j)$ and $P_n(j)$ for each adverse angular rotation.

In a first illustrative implementation of the transmitter 10 according to the present invention, the convolutional encoder 16 of FIG. 2 comprises a four-state convolutional encoder 46 shown in FIG. 6, which is used to map the sixteen-point constellation 32 into four subsets of four points each as shown on level 36 of FIG. 3. The encoder 46 has two delay operators D and one modulo-2 adder and comprises a well-known structure for coding the input bit $x_n^1$. The parity check matrix H(D) for the four-state encoder 46 is given by the following equation:

$$H(D) = [H^1(D) H^0(D)] = [D, D^2 \oplus 1] \quad \text{(Equation 6)}$$

The input bits in $x_n^2$ and $x_n^3$ are the uncoded bits. The parity check Equation 5 for the convolutional encoder 40, when implemented at the modem's receiver, becomes:

$$\hat{y}_n^0 \oplus \hat{y}_{n-2}^0 \oplus \hat{y}_{n-1}^1 = 0 = P_n(0) \quad \text{(Equation 7)}$$

where the subset numbers are given by the values of $\hat{y}_n^0$ and $\hat{y}_n^1$. As previously mentioned, the symbols $\hat{y}$ and $\hat{z}$ to denote that these are voltages associated with the receiver. If there is phase rotation, then Equations 4a, 4b and 4c for the subset number assignment of TABLE 3 reduces to:

$$\hat{Z}_n = (\hat{Y}_n + 1) \text{ Modulo-4 for } 90° \quad \text{(Equation 8a)}$$

$$\hat{Z}_n = (\hat{Y}_n + 2) \text{ Modulo-4 for } 180° \quad \text{(Equation 8b)}$$

$$\hat{Z}_n = (\hat{Y}_n + 3) \text{ Modulo-4 for } 270° \quad \text{(Equation 8c)}$$

Recalling that $\hat{Z}_n = \hat{z}_n^1 \cdot 2^1 + \hat{z}_n^0 \cdot 2^0$ and $\hat{Y}_n = \hat{y}_n^1 \cdot 2^1 + \hat{y}_n^0 \cdot 2^0$, and using Equations 8a through 8c, then 90° rotation is equivalent to:

$$\hat{z}_n^0 = \hat{y}_n^0 \quad \text{(Equation 9a)}$$

$$\hat{z}_n^1 = \hat{y}_n^1 \oplus \hat{y}_n^0$$

180° rotation is equivalent to:

$$\hat{z}_n^0 = \hat{y}_n^0 \quad \text{(Equation 9b)}$$

$$\hat{z}_n^1 = \bar{\hat{y}}_n^1$$

270° rotation is equivalent to:

$$\hat{z}_n^0 = \bar{\hat{y}}_n^0 \quad \text{(Equation 9c)}$$

$$\hat{z}_n^1 = \overline{\hat{y}_n^1 \oplus \hat{y}_n^0}$$

For 90° rotation, the parity check equation becomes:

$$P_n(1) = \hat{z}_n^0 \oplus \hat{z}_{n-1}^1 \oplus \hat{z}_{n-2}^0 = \hat{y}_{n-1}^0 \quad \text{(Equation 10)}$$

For 180° rotation, the parity check equation becomes:

$$P_n(2) = 1 \quad \text{(Equation 11)}$$

For 270° rotation, the parity check equation becomes:

$$P_n(3) = \overline{\hat{y}_{n-1}^0} \quad \text{(Equation 12)}$$

The symbol $\oplus$ indicates an Exclusive Or operation.

Since the output of $P_n(j)$ is indicated by logic level 0 or 1, then the average value of $P_n(j)$ will be 0 for no phase shift, $\frac{1}{2}$ for 90° or 270° phase shift and 1 for 180° phase shift. Furthermore, we can distinguish 90° and 270° rotation by Exclusive Oring $P_n$ with $\hat{y}_{n-1}^0$, i.e., $(P_n(j) \oplus P_n(1))$, so as to define a new function $Q_n(j)$. The following is obtained:

$$Q_n(0) = P_n(0) \oplus \hat{y}_{n-1}^0 = \hat{y}_{n-1}^0 \quad \text{(Equation 13a)}$$

$$Q_n(1) = P_n(1) \oplus \hat{y}_{n-1}^0 = 0 \quad \text{(Equation 13b)}$$

$$Q_n(2) = P_n(2) \oplus \hat{y}_{n-1}^0 = \overline{\hat{y}_{n-1}^0} \quad \text{(Equation 13c)}$$

$$Q_n(3) = P_n(3) \oplus \hat{y}_{n-1}^0 = 1 \quad \text{(Equation 13d)}$$

In this case the average value of $Q_n(n)$ is 0 for a 90° rotation and 1 for a 270° rotation. The average value of $Q_n(j)$ for 0° and 180° rotations is $\frac{1}{2}$. As mentioned earlier, $Q_n(1)$ can be made equal to 1 and $Q_n(3)$ can be made equal to zero by choosing $Q_n(j) = P_n(j) \oplus P_n(3)$. With respect to Equation 5A, in the first case, i=1 and in the second case i=3. In practice, the received signal will be corrupted by noise and other impairments. However, the values of the functions $P_n(j)$ and $Q_n(j)$ will hold good except when the impairments are severe. Specific details will be provided hereinafter on the receiver in which the parity check equation of 14a is implemented. The convolutional encoder 46 of FIG. 6 can be used for the thirty-two point constellation of FIGS. 5a, through 5c in which case each subset has eight points as shown on the second-level 44 and the uncoded bits in bit group is $uY_n$ would be increased to three. Likewise, the uncoded bits $uY_n$ can be mapped such that, when they are decoded after a phase rotation, they remain invariant.

In a second implementation of the transmitter 10, the convolutional encoder 16 of FIG. 2 comprises a conventional eight-state convolutional encoder 48 shown in FIG. 7 which has three-delay elements D and two modulo-2 adders. The eight-state convolutional encoder 48 would have the following parity check matrix:

$$[H^2(D)H^1(D)H^0(D)] = [DD^2D^3 \oplus 1] \quad \text{(Equation 14)}$$

The eight-state convolutional encoder 48 is used with the sixteen-point constellation 32 of FIG. 3 to generate four subsets of level 36 according to Table 4 and when there is no phase rotation, the parity check Equation 5 becomes:

$$P(0) = \hat{y}_{n-1}^2 \oplus \hat{y}_{n-2}^1 \oplus \hat{y}_n^0 \oplus \hat{y}_{n-3}^0 \quad \text{(Equation 14a)}$$

From Equation 4a, 4b, and 4c, for 90°, the following is calculated:

$$\hat{z}_n^1 = \hat{y}_n^1 \oplus \hat{y}_n^0 \quad \text{(Equations 15a)}$$

$$\hat{z}_n^0 = \bar{\hat{y}}_n^0$$

For 180°

$$\hat{z}_n^1 = \bar{\hat{y}}_n^1 \quad \text{(Equations 15b)}$$

$$\hat{z}_n^0 = \hat{y}_n^0$$

For 270°

$$\hat{z}_n^1 = \overline{\hat{y}_n^1 \oplus \hat{y}_n^0} \quad \text{(Equations 15c)}$$

$$\hat{z}_n^0 = \hat{y}_n^0$$

Substituting Equation 15a, 15b, and 15c, into Equation 14a the following is calculated:

$$P(1) = \hat{y}_{n-2}^0 \quad \text{(Equation 16a)}$$

$$P(2) = 1 \quad \text{(Equation 16b)}$$

$$P(3) = \bar{\hat{y}}_{n-2}^0 \quad \text{(Equation 16c)}$$

As with the example of FIG. 6, P(1) and P(3) would have an average value of $\frac{1}{2}$ and P(2) an average value of 1. 90° and 270° can be distinguished by examining the function $Q_n(j)$.

In a variation of the above-described implementation, the convolutional encoder 48 can also be used in association with the four subsets of the thirty-two point constellation of FIGS. 5b and 5c shown on the second-level 44. In this case, there would still be four subsets, but each subset has eight points; hence, the uncoded bits are increased to three. In general, there is a convolutional encoder available for each level of subdivison of the constellation and as is well-known in the art, the convolutional encoder will normally be selected which maximizes the free (minimum) distance between a plurality of sequentially coded bit groups $Y_n$.

Although specific cases of convolutional encoders have been illustrated and have been associated with various signal constellations, these are merely exemplary of many possible encoder and subset combinations in which can exist in modems incorporating the present invention. The invention can be used in association with convolutional encoder (generator matrix) which can be obtained by transforming the original matrix. While there are many other examples, some of the more common examples would be to use this technique with 64, 128 and 256 point signal constellation. For instance, it is well-known that an eight-state encoder with 16 point subsets gives good minimum distance results with a 128 point signal constellation in a 14,400 bits per second modem. It is also contemplated that the present invention can be used convolutional encoders having non-linear logic.

Referring to Equation 5, for the examples described so far, the conditions the parity check has to satisfy in order for $P_n(1)=\overline{P_n(3)}$ and $P_n(0)=\overline{P_n(2)}$ (where "-" indicates compliment) are: (1) the term $H^1(d)$ of the parity check matrix $[H^r(D) \ldots H^1(D) H^0(D)]$ has an odd number of terms, and (2) the term $H^0(D)$ of the parity check matrix has an even number of terms. These conditions are not overly restrictive because it has been shown in the previously mentioned Ungerboeck article that if:

$$[H^r(D) \ldots H^t(D) \ldots H^s(D) \ldots H^0(D)]$$

Where $0 \leq s \leq t \leq r$ has the desired coding again, but does not satisfy the conditions (1) and (2), then a transformation can be applied so that restrictions (1) and (2) are satisfied. Under this transformation the new parity check matrix becomes:

$$[H^r(D) \ldots H^t(D) \ldots H^t(D) \oplus H^s(D) \ldots H^0(D)]$$

As is known in the art, this transformation preserves the coding gain and can be applied repeatedly.

Although all the techniques described here have been illustrated using nonsystematic encoders, it will be clear to those skilled in the art that these techniques are equally applicable for systematic encoders.

A portion of a receiver 50 of the modem 12 necessary to illustrate the invention is shown in FIG. 8. The received signal R(t) is sampled by a sampler and A/D converter 52, equalized and demodulated by an equalizer and demodulator means 54 in one of many different ways known in the art, some of which are shown in U.S. Pat. No. 3,878,468 to Falconer et al., and U.S. Pat. No. 4,028,626 to Motley et al., both of which are incorporated by specific reference thereto. Although a passband equalizer 56 is shown, i.e., a demodulator 58 after equalizer 56, the present invention is equally applicable to a receiver having a baseband equalizer, i.e., demodulation before equalization. The equalized and demodulated signal, representing a two-dimensional, complex valued signal, is fed to a conventional slicer 60 which has as an output the uncoded bits and the coded bits and as previously described the coded bits represent the subset number of the most likely subset. The slicer 60 is of the conventional type and can be realized using comparators. The slicer 60 is followed by a Viterbi detector 62 of conventional type such as illustrated in the previously incorporated U.S. Pat. No. 4,077,021 and the articles "Viterbi Decoding for Satellite and Space Communications," by J. A. Heller et al., published in IEEE Trans. Comm. Tech., Vol. COM-19 (1971), and "The Viterbi Algorithm" by G. D. Forney, published in Proc. IEEE, Vol. 61 (1973). A voltage controlled oscillator (VCO) 64 is used for deriving the local carrier and the phase of the local carrier can be tracked in conjunction with the equalizer 56 using known techniques such as shown in the previously mentioned U.S. Pat. Nos. 3,878,468 and 4,028,626. To explain the implementation of our invention in the receiver, a brief description will be given of the well-known phase lock-loop (PLL) technique used in the receiver and illustrated in FIG. 8. A carrier PLL 65 includes the slicer 60, the detector 62, the VCO 64, the multiplier 58, and a VCO error generator 66 which includes a low-pass filter. This loop has a characteristic which repeats itself every $\tau/2$ as shown in FIG. 9, which is a plot of the error voltage against the phase error. Whenever there is a phase bit of 90° or multiple of 90° and the resulting line signal is shifted in phase by a multiple of 90°, then the receiver PLL cannot distinguish between $\theta$ and $\theta+90°$. As mentioned earlier, this causes the received signal to be decoded incorrectly. The Viterbi detector 62 and the subsequent decoder 68 provide an estimate of the transmitted sequence $a\hat{X}_n$. The structure of the receiver described so far with respect to FIG. 8 is well-known in the art and is per se not part of the invention. In the preferred embodiment the above-described receiver circuits, after the sampler and A/D converter 52, are implemented by a microprocessor. Accordingly, all of these circuits are those typically already available in conventional digital data, microprocessor-based modems. As will be appreciated by those in the art, the microprocessor-based modem control and data processing circuits (not shown) also typically include the usual data storage elements (e.g. ROM for program control storage and the like, and RAM for variable input/output/intermediate result data, etc.) conventionally associated with a microprocessor CPU for performing desired manipulation of digital signals in accordance with a stored program. In the presently preferred exemplary embodiment, these already present microprocessor CPU, ROM and RAM elements are also utilized to perform the hereinafter described elements of the invention. However, such functions could be performed in a hard-wired implementation. FIG. 8 also suggests the form that a hard-wired implementation might take.

In accordance with the present invention, the amount of phase shift comprising adverse angular rotations is calculated using the Pn and Qn functions and the phase of the carrier is adjusted accordingly. In FIG. 8 phase rotation detector means 68 and the methodology therein, for the purpose of illustration, is depicted in a generalized schematic that is suggestive of a hard-wired implementation in accordance with the present invention. However, in the preferred implementation of the present invention, the phase rotation detector means 68 is implemented in software and will be described in detail, after a brief description of the hard-wired implementation, by flow charts of a computer program segment that can be embodied in the microprocessor based modem using the existing microprocessor circuits. The detector means 68 includes parity check means 70, which is provided for implementing specific versions of Equation 5, such as shown in Equations 7 and 14a. The exact party check equations to be implemented in the parity check means 70 is a function of the number of states of the convolutional encoder, which is a matter of design choice. As will be shown in more detail hereinafter in FIGS. 10 and 11, bits $y_n^0$ through $y_n^r$ are provided to each of a plurality of delay lines in the parity check means 70. Each delay line includes a series of delay elements, with each delay element having a one symbol period T, i.e., one baud time delay. A plurality of tap lines and their specific number and location of connection depend upon the specific equation resulting from Equation 5. The tap lines are connected to a plurality of Exclusive OR's to produce the previously described $P_n$ and $Q_n$ outputs. For example, when Equation 5 reduces to Equation 7, then the connections are as shown in FIG. 10. Likewise, when Equation 5 reduces to Equation 14a, then the connections are as shown in FIG. 11.

In FIGS. 10 and 11, the delay lines are identified by the numerical 72, the tap lines are identified by the numeral 74, the delay elements are identified by the symbols D, and the EXCLUSIVE OR's are identified by ⊕. As previously mentioned, these FIGURES merely show hard-wired implementations of the parity check means 70 for the purposes of illustration and flow diagrams of the preferred microprocessor implementation will be provided hereinafter.

The outputs $P_n$ and $Q_n$ from the parity check means 70 each drive one of two one-bit digital to analog converters 76 and 78, with a received zero bit causing a $+E$ volts output and a received one bit causing a $-E$ volts output from the converters 76 and 78. The analog outputs from converters 76 and 78 are filtered by a pair of RC network filters 80 and 82, respectively. Three comparators 84, 86 and 88 are provided, with the output of the filter 80 being electrically coupled to the negative input terminal of the comparator 84 and the output of the filter 78 being electrically coupled to the positive input terminal of the comparator 86 and the negative input terminal of the comparator 88. A reference voltage of $-XE$ volts is electrically coupled to the two positive input terminals of comparators 84 and 88. A reference voltage of $+XE$ volts is electrically coupled to the negative input terminal of the comparator 86. The time constants of the filters 80 and 82 and the value of X are chosen according to the desired speed of response of the expected amount of system noise. For expected output error rates of the order of $1 \times 10^{-5}$, the RC time constant should be chosen between 16 and 64 symbol intervals and the value of $X(0<X<1)$ must be in the range 7/8 to ½.

The comparators 84, 86, and 88 serve, respectively, as 180° ccw (counterclockwise rotation), 90° ccw, 270° ccw detectors. The outputs of the three comparators 84, 86, and 88 are fed to a decision circuit 90 which operates as follows. Whenever there is a phase rotation, one of the signals from the comparators 84, 86 and 88 becomes high, which in turn causes the decision circuit 90 to provide a phase correction signal at output 92. This signal in turn inhibits further correction for a length of time equal to two RC time constants by starting a timer 94.

Phase correction means 95, using the phase correction signal, can apply the phase correction in many different ways. In one way shown in FIG. 8, this phase correction can be applied the phase lock-loop 65 via line 96 to a summer 98 so that the PLL carrier phase estimation (preferred) is adjusted. Alternatively, the phase correction can be added to the subset number used by the decoder 62 which decodes the bit output sequence from the slicer 60. This phase correction information can also be used to correct the past subset numbers.

The preferred exemplary embodiment achieves the implementation of the rotation detector means 68 and the phase correction means 95 by including an additional small program segment or subroutine in the microprocessor circuits. A simplified exemplary flow diagram for one possible program segment is shown in FIG. 12. After the usual start or program entry at 100, the slicing routine at step 102 determines the closest ideal point to the received point. The parity check routine computes the value of $P_n$ and $Q_n$ polynomial at step 104 and the results are time averaged (integrated) to eliminate noise spikes from influencing the results at step 106. If $P_n=0$ no phase adjustment is needed and the program branches back to step 102. If $P_n=1$, then the program branches to step 108 and if the timer at step 108 is not on (which inhibits correction), then the program proceeds to step 110 where the VCO phase is increased by 180°. A timer (identified by 94 in FIG. 8) is then turned on so that further correction is inhibited for a period of approximately 30 bauds, i.e., symbol periods T. At step 106, if the value of $P_n$ is between 0 and 1 the program proceeds to step 112 and if $Q_n=0$, then the phase of the VCO is increased by 90° at step 114, assuming that timer is not in the inhibitive mode at step 116. Similarly at step 106 for $P_n$ between 0 and 1 at step 106 and Q=1 at step 112, the program branches to step 118 and the phase of the VCO is increased by 270°, assuming the timer is not in the inhibitive mode at step 120. In each of these cases, after the VCO phase is set, the timer is then turned on to inhibit further correction for a period. If the noise is excessive so that the operation of this circuit is not proper then (optionally) the circuit can send alarm via line 122.

Another possible arrangement is described hereinafter. Instead of integrating the values of P and Q (to mitigate the effect of noise), the decision on an alternate scheme can also be used. In this scheme P is set to be 1 if there are consecutive 1's for 16 bauds. If for 16 bauds the value of P(j) alternates between 0 and 1 (the alternation could be 30% of 0 and 70% of 1 or vice versa), then P is taken to be $y_2$. Similarly, $Q_n$ is set to be 1, if it is one for 16 bauds. As in the previous scheme, if the circuit malfunctions because of excessive noise, an alarm is sent.

As previously mentioned, the assignment of subset numbers according to equations 4a through 4c is merely illustrative of any possible numbering schemes that will be obvious to those skilled the art. Another numbering scheme which can be used for phase rotation detection is shown in TABLE 5. This arrangement is only for a convolutional encoder 16 of FIG. 2 which takes the form of an encoder with at least eight subsets.

TABLE 5

| $y^2$ | $y^1$ | $y^0$ | $Y_n$ | $z^2$ | $z^1$ | $z^0$ | $Z_n$ |
|---|---|---|---|---|---|---|---|
| \multicolumn{8}{c}{180°} |
| 0 | 0 | 0 | (0) | 1 | 1 | 0 | (6) |
| 1 | 0 | 0 | (4) | 0 | 1 | 0 | (2) |
| 0 | 0 | 1 | (1) | 1 | 1 | 1 | (7) |
| 0 | 1 | 1 | (3) | 1 | 0 | 1 | (5) |

| $y^2$ | $y^1$ | $y^0$ | $Y_n$ | $z^2$ | $z^1$ | $z^0$ | $Z_n$ |
|---|---|---|---|---|---|---|---|
| \multicolumn{8}{c}{90°} |
| 0 | 0 | 0 | (0) | 1 | 0 | 1 | (5) |
| 0 | 1 | 0 | (2) | 1 | 1 | 1 | (7) |
| 1 | 0 | 0 | (4) | 0 | 0 | 1 | (1) |
| 1 | 1 | 0 | (6) | 0 | 1 | 1 | (3) |
| 0 | 0 | 1 | (1) | 0 | 1 | 0 | (2) |
| 0 | 1 | 1 | (3) | 0 | 0 | 0 | (0) |
| 1 | 0 | 1 | (5) | 1 | 1 | 0 | (6) |
| 1 | 1 | 1 | (7) | 1 | 0 | 0 | (4) |

| $y^2$ | $y^1$ | $y^0$ | $Y_n$ | $z^2$ | $z^1$ | $z^0$ | $Z_n$ |
|---|---|---|---|---|---|---|---|
| \multicolumn{8}{c}{270°} |
| 0 | 0 | 0 | (0) | 0 | 1 | 1 | (3) |
| 0 | 1 | 0 | (2) | 0 | 0 | 1 | (1) |
| 1 | 0 | 0 | (4) | 1 | 1 | 1 | (7) |
| 1 | 1 | 0 | (6) | 1 | 0 | 1 | (5) |
| 0 | 0 | 1 | (1) | 1 | 0 | 0 | (4) |
| 0 | 1 | 1 | (3) | 1 | 1 | 0 | (6) |
| 1 | 0 | 1 | (5) | 0 | 0 | 0 | (0) |
| 1 | 1 | 1 | (7) | 0 | 1 | 0 | (2) |

The rules for rotation for the assignment of subset numbers in TABLE 5 are:

180°
$$z_n^0 = y_n^0$$
$$z_n^1 = \bar{y}_n^1$$
$$z_n^2 = y_n^2$$

90°
$$z_n^0 = \bar{y}_n^0$$
$$z_n^1 = y_n^1 \oplus y_n^0$$
$$z_n^2 = y_n^2 \oplus \bar{y}_n^0$$

270°
$$z_n^0 = y_n^0$$
$$z_n^1 = y_n^1 \oplus \bar{y}_n^0$$
$$z_n^2 = y_n^2 \oplus y_n^0$$

Note that a trivial variation would be to interchange 5 and 3 and 1 and 7 (in TABLE 5) in the 90° and 270° rotation. In this case the 90° rotation would read as 90°
$$z_n^0 = \bar{y}_n^0$$
$$z_n^1 = y_n^1 \oplus \bar{y}_n^0$$
$$z_n^2 = y_n^2 \oplus y_n^0$$
(Equation 17a)

270°
$$z_n^0 = \bar{y}_n^0$$
$$z_n^1 = y_n^1 \oplus y_n^0$$
$$z_n^2 = y_n^2 \oplus \bar{y}_n^0$$
(Equation 17b)

For this numbering arrangement to indicate the phase rotation the parity check matrix H(D) of the parity check equation, i.e., Equation 5, must have the following condition:

(1) $H^0(D)$ must have an even number of terms and
(2) $H^1(D) \oplus H^2(D)$ must have an odd number of terms.

Examples of this type of parity check matrix H(D) are given hereinafter for ⅔ convolutional encoders with eight and sixteen states.

Eight-state $$[H^2(D)H^1(D)H^0(D)] = [D^2 \oplus D\, D\, D^3 \oplus 1]$$

Sixteen-state $$[H^2(D)H^1(D)H^0(D)] = [D^3 \oplus D\, D^2 D^4 \oplus D^2 \oplus D \oplus 1] \quad \text{(Equation 18)}$$

For the eight-state the parity equation is (assume $\hat{y}_n^i$ is the receiver estimate of $y_n^i$):

$$P_n(0) = \hat{y}_{n-2}^2 \oplus \hat{y}_{n-1}^2 \oplus \hat{y}_{n-1}^1 \oplus \hat{y}_{n-3}^0 \oplus \hat{y}_n^0 = 0$$

$$P_n(1) = \bar{\hat{y}}_{n-2}^0 \oplus \bar{\hat{y}}_{n-1}^0 \oplus \hat{y}_{n-1}^0$$

$$P_n(2) = 1$$

$$P_n(3) = \hat{y}_{n-2}^0 \oplus \hat{y}_{n-1}^0 \oplus \bar{\hat{y}}_{n-1}^0$$

The function Q is obtained as before by:

$$Q_n = P_n(j) \oplus P(3) = \hat{y}_{n-2}^2 \oplus \hat{y}_{n-1}^2 \oplus \hat{y}_{n-1}^1 \oplus \hat{y}_{n-3}^0 \oplus \bar{\hat{y}}_{n-2}^0 \oplus \hat{y}_n^0$$

so that:

$$Q(1) = 0$$

$$Q_n(3) = 1 \quad \text{(Equation 20)}$$

Similarly, for the sixteen-state convolutional encoder:

(Equation 21)
$$P_n(0) = \hat{y}_{n-3}^2 \oplus \hat{y}_{n-1}^2 \oplus \hat{y}_{n-2}^1 \oplus \hat{y}_{n-4}^0 \oplus \hat{y}_{n-2}^0 \oplus \hat{y}_{n-1}^0 \oplus \hat{y}_n^0 = 0$$

$$P_n(1) = \bar{\hat{y}}_{n-3}^0 \oplus \bar{\hat{y}}_{n-1}^0 \oplus \hat{y}_{n-2}^0$$

$$P_n(2) = 1$$

$$P_n(3) = \hat{y}_{n-3}^0 \oplus \hat{y}_{n-1}^0 \oplus \bar{\hat{y}}_{n-2}^0$$

(Equation 22)
$$Q_n = P_n \oplus P_n(3) = \hat{y}_{n-3}^2 \oplus \hat{y}_{n-2}^2 \oplus \hat{y}_{n-1}^1 \oplus \hat{y}_{n-4}^0 \oplus \hat{y}_{n-3}^0 \oplus \bar{\hat{y}}_n^0$$

$$Q_n(1) = 0$$

$$Q_n(3) = 1$$

Two specific implementations of the convolutional encoder 16 of FIG. 2 in the form of nonsystematic encoders for the eight and sixteen state are shown in FIGS. 13a and 13b. The coded bit group $Y_n$ for the eight-state convolutional encoder 100 of FIG. 13a is as follows:

$$y_n^2 = x_n^2 \oplus x_{n-2}^1$$

$$y_n^1 = x_n^2 \oplus x_{n-1}^2 \oplus x_{n-2}^1 \oplus x_n^1$$

$$y_n^0 = x_{n-1}^1$$

The coded bit group $Y_n$ for the sixteen-state convolutional encoder 102 of FIG. 13b is as follows:

$$y_n^2 = x_n^1 \oplus x_{n-2}^1 \oplus x_{n-1}^2$$

$$y_n^1 = x_{n-1}^1 \oplus x_n^1 \oplus x_{n-2}^2 \oplus x_n^2$$

$$y_n^0 = x_{n-1}^1$$

Two specific implementations of the parity check means 70 of FIG. 8 are shown in FIGS. 14a and 14b. The parity check generator means 104 of FIG. 14a is implemented in combination with the eight-state convolutional encoder of FIG. 13a. The parity check generator means 106 of FIG. 14b is implemented in combination with the sixteen-state convolutional encoder of FIG. 13b. FIG. 15 shows the numbering for a sixteen-point constellation 108 using TABLE 5 for a two-point subset. Similarly, a trivial variation of the numbering shown in TABLE 1 can be obtained by interchanging subsets 3 and 1 and 5 and 7 in TABLE 1. Following this for 90: rotation:

$$z_n^0 = \bar{y}_n^0$$

$$z_n^1 = y_n^0 \oplus y_n^1$$

$$z_n^2 = y_n^2 \text{ (optional)}$$

and for 270: rotation:

$$z_n^0 = y_n^0$$

$$z_n^1 = \overline{y_n^0 \oplus y_n^1}$$

$$z_n^2 = y_n^2 \text{ (optional)}$$

In all there are four possibilities for subset numbering systems described above. Another set of four possibilities can be achieved by interchanging $x_n^2$ and $x_n^1$ at the input and $y_n^0$ and $y_n^2$ at the output.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A modulation-demodulation system for transmitting a plurality of information bit sequences, said system including a transmitter having state machine means for transforming by a coding process each said information bit sequence into an expanded bit sequence having at least a coded bit group portion, and said transmitter further having modulated carrier generating means for modulating a carrier signal to assume one of a plurality of multilevel symbols from a signal constellation in response to each sequentially applied said expanded bit sequence with said coded bit group portion associated with one of a plurality of subsets of said multilevel symbols, said multilevel symbols being capable of representation in a two-dimensional complex plane, and said system further including a receiver having demodulation and slicer means for demodulating and detecting said modulated carrier signal to obtain a received expanded bit sequence, wherein the improvement comprises:

said subsets arranged and identified so that, when rotated in said complex plane by one of a plurality of adverse angular rotations, each said subset substantially maps upon a unique, predetermined said subset other than itself for each of said adverse angular rotations;

phase rotation detection means, coupled to said demodulation and slicer means, for uniquely identifying each said adverse angular rotation and 0° angular rotation, in response to a plurality of sequentially received coded bit group portions of said received expanded bit sequence, and phase correction means, coupled to said phase rotation detection means, for compensating for said adverse angular rotations in an output signal of said receiver.

2. The modulation-demodulation system of claim 1, wherein said adverse angular rotations are substantially ±90° and 180°.

3. The modulation-demodulation system of claim 2, wherein said phase rotation detection means includes means for computing a parity check equation $P_n(j)$ to determine j, where:

$$P_n(j) = [\hat{y}_n^r(D) \ldots \hat{y}_n^1(D), \hat{y}_n^0(D)] \cdot [H^r(D) \ldots H^1(D), H^0(D)]^T$$

and where $\hat{y}(D)$ represents each bit of said received coded bit group portion, $H(D)$ represents each term of a parity check matrix, n is the symbol period, $j=0$ for 0°, $j=1$ for 90° rotation, $j=2$ for 180° rotation, and $j=3$ for 270° rotation.

4. The modulation-demodulation system of claim 3, wherein said phase rotation detection means further includes means for computing an equation $Q_n(j)$ for at least each said $P_n(j)$ that does not provide a unique identifying value for a given said adverse angular rotation, where:

$$Q_n(j) = P_n(j) \oplus P_n(i)$$

and where $i=1$ or 3, $i=1$ for 90° rotation and $i=3$ for 270° rotation, whereby said $P_n(j)$ provides said unique identifying values for 0° rotation and 180° rotation and said $Q_n(j)$ provides said unique identifying values for 90° rotation and 270° rotation.

5. The modulation-demodulation system of claim 4, wherein both said equations $P_n(j)$ and $Q_n(j)$ provide a discrete binary value for each of a plurality of symbol periods, each said symbol period corresponding to a time interval during which one of said multilevel symbols is transmitted, and wherein said phase rotation means further includes means for determining at the end of said plurality of symbol periods one of said angular rotations from said discrete binary values.

6. The modulation-demodulation system of claim 5, wherein said means for determining further includes computing an average value of said discrete binary values over said plurality of symbol periods for both said equations $P_n(j)$ and $Q_n(j)$, said average value which has a magnitude at the end of said plurality of symbol periods which approaches or is equal to a discrete binary value comprises said unique identifying value for one of said angular rotations.

7. The modulation-demodulation system of any one of claims 1 through 6, wherein said expanded bit sequence includes an uncoded bit group portion having at least one bit and each said subset includes a plurality of said multilevel symbols, said modulated carrier generating means further including means for using said uncoded bit group portion for selecting said one multilevel symbol for modulating said carrier signal from said one of a plurality of subsets selected by said coded bit group portion.

8. The modulation-demodulation system of any one of claims 1 through 6, wherein said expanded bit sequence includes only said coded bit group portion and each said subset includes a single said multilevel symbol.

9. In a data modem including a transmitter having a convolutional encoder for transforming each of a plurality of information bit sequences into an expanded bit sequence having at least a coded bit group portion; said modem further including a modulated signal generating means for generating a plurality of complex-valued symbols, for selecting from said plurality of complex-valued symbols at least one said symbol to define a subset in response to said expanded bit sequence, and for modulating a carrier signal to assume one of said symbols from said subset so as to generate a modulated carrier signal for transmission; and said modem further including a receiver having demodulation and slicer means for demodulating and detecting a received modulated carrier signal to obtain a received expanded bit sequence having at least a received coded bit group portion, the improvement comprising:

said modulated carrier generating means having said subsets arranged and identified so that, when rotated in a complex plane by one of a plurality of adverse angular rotations, each said subset is substantially coincident with a unique, predetermined said subset other than itself for each of said adverse angular rotations;

phase rotation detection means, coupled to said demodulation and slicer means, for uniquely identifying each possible adverse angular rotation, in response to a plurality of said received coded bit group portions; and phase correction means, coupled to said phase rotation detection means, for correcting for said detected adverse angular rotation in said receiver.

10. The data modem of claim 9, wherein said adverse angular rotations are substantially ±90° and 180°.

11. The data modem of claim 10, wherein said phase rotation detection means includes means for computing a parity check equation $P_n(j)$ to determine j, where:

$$P_n(j) = [\hat{y}_n{}^r(D) \ldots \hat{y}_n{}^1(D), \hat{y}_n{}^0(D)] \cdot [H^r(D) \ldots H^1(D), H^0(D)]^T$$

and where $\hat{y}(D)$ represents each bit of said received coded bit group portion, H(D) represents each term of a parity check matrix, n is the symbol period, j=0 for 0°, j=1 for 90° rotation, j=2 for 180° rotation, and j=3 for 270° rotation.

12. The data modem of claim 11, wherein said phase rotation detection means further includes means for computing an equation $Q_n(j)$ for at least each said $P_n(j)$ that does not provide a unique identifying value for a given said adverse angular rotation, where:

$$Q_n(j) = P_n(j) \oplus P_n(i)$$

and where i=1 or 3, i=1 for 90° rotation and i=3 for 270° rotation, whereby said $P_n(j)$ provides said unique identifying values for 0° rotation and 180° rotation and said $Q_n(j)$ provides said unique identifying values for 90° rotation and 270° rotation.

13. The data modem of claim 12, wherein both said equations $P_n(j)$ and $Q_n(j)$ provide a discrete binary value for each of a plurality of symbol periods, each said symbol period corresponding to a time interval during which one of said multilevel symbols is transmitted, and wherein said phase rotation means further includes means for determining at the end of said plurality of symbol periods one of said angular rotations from said discrete binary values.

14. The data modem of claim 13, wherein said means for determining further includes computing an average value of said discrete binary values over said plurality of symbol periods for both said equations $P_n(j)$ and $Q_n(j)$, said average value which has a magnitude at the end of said plurality of symbol periods which approaches or is equal to a discrete binary value comprises said unique identifying value for one of said angular rotations.

15. The data modem of claim 14, wherein said expanded bit sequence includes an uncoded bit group portion having at least one bit and each said subset includes a plurality of said complexed-valued symbols, said modulated carrier generating means further including means for using said uncoded bit group portion for selecting said one complexed-valued symbol for modulating said carrier signal from said one of a plurality of subsets selected by said coded bit group portion.

16. The data modem of claim 14, wherein said expanded bit sequence includes only said coded bit group portion and each said subset includes a single said complexed-valued symbol.

17. In a modulation-demodulation method for transmitting a plurality of information bit sequences including the steps of transforming by a coding process each of the information bit sequences into an expanded bit sequence having at least a coded bit group portion, subdividing a signal constellation of multilevel symbols into a plurality of subsets with each subset having at least one multilevel symbol, selecting one of the plurality of subsets in response to each sequentially applied coded bit group portion, modulating a carrier signal by one multilevel symbol from the selected subset to generate a modulated carrier signal for transmission, and demodulating and detecting a received modulated carrier signal to obtain a received expanded bit sequence having at least a received coded bit group portion, wherein the improvement comprises:

said step of subdividing including the step of arranging and identifying the subsets so that, when rotated in the complex plane by one of a plurality of adverse angular rotations, each said subset substantially maps upon a unique, predetermined subset other than itself for each of the adverse angular rotations; and after said step of demodulating, uniquely identifying by analyzing a plurality of the received coded bit group portions each of said adverse angular rotation and 0° angular rotation.

18. The modulation-demodulation method of claim 17, wherein said step of uniquely identifying includes uniquely identifying each of the adverse angular rotations and 0° angular rotation.

19. The modulation-demodulation method of claims 17 or 18, wherein said step of uniquely identifying includes applying a parity check equation $P_n(j)$ to the sequentially received coded bit group portions to determine j, where:

$$P_n(j) = [\hat{y}_n{}^r(D) \ldots \hat{y}_n{}^1(D), \hat{y}_n{}^0(D)] \cdot [H^r(D) \ldots H^1(D), H^0(D)]^T$$

and where y(D) represents each bit of said received coded bit group portion, H(D) represents each term of a parity check matrix, n is the symbol period, j=0 for 0°, j=1 for 90° rotation, j=2 for 180° rotation, and j=3 for 270° rotation.

20. The modulation-demodulation method of claim 19, wherein said step of uniquely identifying further includes computing an equation $Q_n(j)$ for at least each said $P_n(j)$ that does not provide a unique identifying value for a given said adverse angular rotation, where:

$$Q_n(j) = P_n(j) \oplus P_n(i)$$

and where i=1 or 3, i=1 for 90° rotation and i=3 for 270° rotation, whereby said $P_n(j)$ provides said unique identifying values for 0° rotation and 180° rotation and said $Q_n(j)$ provides said unique identifying values for 90° rotation and 270° rotation.

21. The modulation-demodulation method of claim 20, wherein both said equations $P_n(j)$ and $Q_n(j)$ provide a discrete binary value for each of a plurality of symbol periods, each said symbol period corresponding to a time interval during which one of said multilevel symbols is transmitted, and wherein said step of uniquely identifying further includes determining at the end of said plurality of symbol periods one of said angular rotations from said discrete binary values.

22. The modulation-demodulation method of claim 21, wherein said step of uniquely identifying further includes computing an average value of said discrete binary values over said plurality of symbol periods for both said equations $P_n(j)$ and $Q_n(j)$, said average value which has a magnitude at the end of said plurality of symbol periods which approaches or is equal to a discrete binary value comprises said unique identifying value for one of said angular rotations.

23. The modulation-demodulation method of claim 21, wherein said step of subdividing the signal constellation includes providing the subsets with a plurality of the multilevel symbols, said step of expanding the information bit sequence includes providing the expanded bit sequence with an uncoded bit group portion, said step of modulating a carrier signal including selecting one of the multilevel symbols for modulation from the selected subset in response to the uncoded bit group portion.

24. The modulation-demodulation method of claim 21, wherein said step of subdividing the signal constellation includes providing each subset with only one point.

25. The modulation-demodulation method of claim 21, further including removing said adverse angular rotations from an output signal derived from the received modulated carrier signal.

26. The modulation-demodulation method of claim 17, further including removing said adverse angular rotations from an output signal derived from the received modulated carrier signal.

* * * * *